United States Patent
Hayashi et al.

(12)

(10) Patent No.: US 6,321,188 B1
(45) Date of Patent: *Nov. 20, 2001

(54) INTERACTIVE SYSTEM PROVIDING LANGUAGE INFORMATION FOR COMMUNICATION BETWEEN USERS OF DIFFERENT LANGUAGES

(75) Inventors: Hiroshi Hayashi; Hiromi Furusawa; Goro Noda; Tomoe Maruta, all of Ebina (JP)

(73) Assignee: Fuji Xerox Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/543,312

(22) Filed: Oct. 16, 1995

(30) Foreign Application Priority Data

Nov. 15, 1994 (JP) .................................................. 6-305556
Sep. 20, 1995 (JP) .................................................. 7-242079

(51) Int. Cl.[7] .................................................. G06F 17/60
(52) U.S. Cl. .................................................. 704/4; 707/536
(58) Field of Search .................................... 395/751, 752, 395/753, 754, 757, 2.66, 2.8; 340/825.19; 379/52, 93, 96, 97, 98; 704/1, 2, 3, 4, 7, 271, 277, 257; 705/1, 50, 51

(56) References Cited

U.S. PATENT DOCUMENTS

| 4,158,236 | 6/1979 | Levy . |
|---|---|---|
| 4,630,235 | * 12/1986 | Hashimoto et al. . |
| 4,633,435 | * 12/1986 | Morimoto et al. . |
| 4,866,670 | 9/1989 | Adachi et al. . |
| 4,908,845 | * 3/1990 | Little . |
| 4,958,366 | 9/1990 | Hashimoto . |
| 5,063,534 | * 11/1991 | Kishimoto . |
| 5,077,804 | 12/1991 | Richard . |
| 5,122,951 | 6/1992 | Kamiya . |
| 5,136,505 | * 8/1992 | Inamori et al. . |

(List continued on next page.)

FOREIGN PATENT DOCUMENTS

| 30 37 480 A1 | 4/1981 | (DE) . |
|---|---|---|
| 0 265 280 A2 | 4/1988 | (EP) . |
| 0 376 316 A2 | 4/1990 | (EP) . |
| 0 574 006 A1 | 12/1993 | (EP) . |
| 0 604 964 A2 | 7/1994 | (EP) . |
| 2 014 765 A | 8/1979 | (GB) . |
| 2 043 975 A | 10/1980 | (GB) . |
| A-4-84554 | 3/1992 | (JP) . |
| A-6-84554 | 3/1994 | (JP) . |
| 405120324-A | * 5/1993 | (JP) .............................. G06F/15/38 |
| WO 93/22733 | 11/1993 | (WO) . |
| WO 95/21529 | 8/1995 | (WO) . |

OTHER PUBLICATIONS

"Computer Esperanto Just Years Off", by Malcolm Laws, CommunicationsWeek International, p54, Nov. 4, 1991.*

*Primary Examiner*—James P. Trammell
*Assistant Examiner*—Calvin L Hewitt, II
(74) *Attorney, Agent, or Firm*—Oliff & Berridge, PLC

(57) ABSTRACT

An apparatus for language translation is arranged such that phrases having identical meanings in different languages are stored by category. Following inputs of a phrase, a user selects a language by a language selecting button, observes a translation of the input phrase and selects a response phrase by up/down, left/right scroll buttons. On the basis of this selection, the selected response phrase in the particular language is read out from a storage device, is displayed on a display, and an address number of this phrase is transmitted to a remote plate by making use of a telephone line or the like. A receiver in the remote place outputs a received phrase in a particular language from its storage device on the basis of the received phrase number and the designation of the particular language.

18 Claims, 22 Drawing Sheets

U.S. PATENT DOCUMENTS

| | | |
|---|---|---|
| 5,175,684 | 12/1992 | Chong . |
| 5,268,839 * | 12/1993 | Kaji . |
| 5,295,068 * | 3/1994 | Nishino et al. . |
| 5,307,265 * | 4/1994 | Winans . |
| 5,317,671 * | 5/1994 | Baker . |
| 5,379,213 * | 1/1995 | Derks ................................. 364/411 |
| 5,384,701 * | 1/1995 | Stentiford et al. . |
| 5,412,712 * | 5/1995 | Jennings . |
| 5,576,953 * | 11/1996 | Hugentobler ........................ 395/752 |
| 5,606,498 * | 2/1997 | Maruta et al. ...................... 395/757 |
| 5,689,671 * | 11/1997 | Stromberg . |

\* cited by examiner

FIG. 3A   FIG. 3B   FIG. 3C

| PHRASE NO. | JAPANESE | ENGLISH |
|---|---|---|
| 0001 | hai | Yes. |
| 0002 | iie | No. |
| 0003 | wakarimashita | I understand. |
| 0004 | wakarimasen | I don't understand. |
| 0005 | sumimasen | Excuse me. |
| 0006 | konnichiwa | Hello. |
| 0007 | hajime mashite | How do you do ? |
| ⋮ | ⋮ | ⋮ |

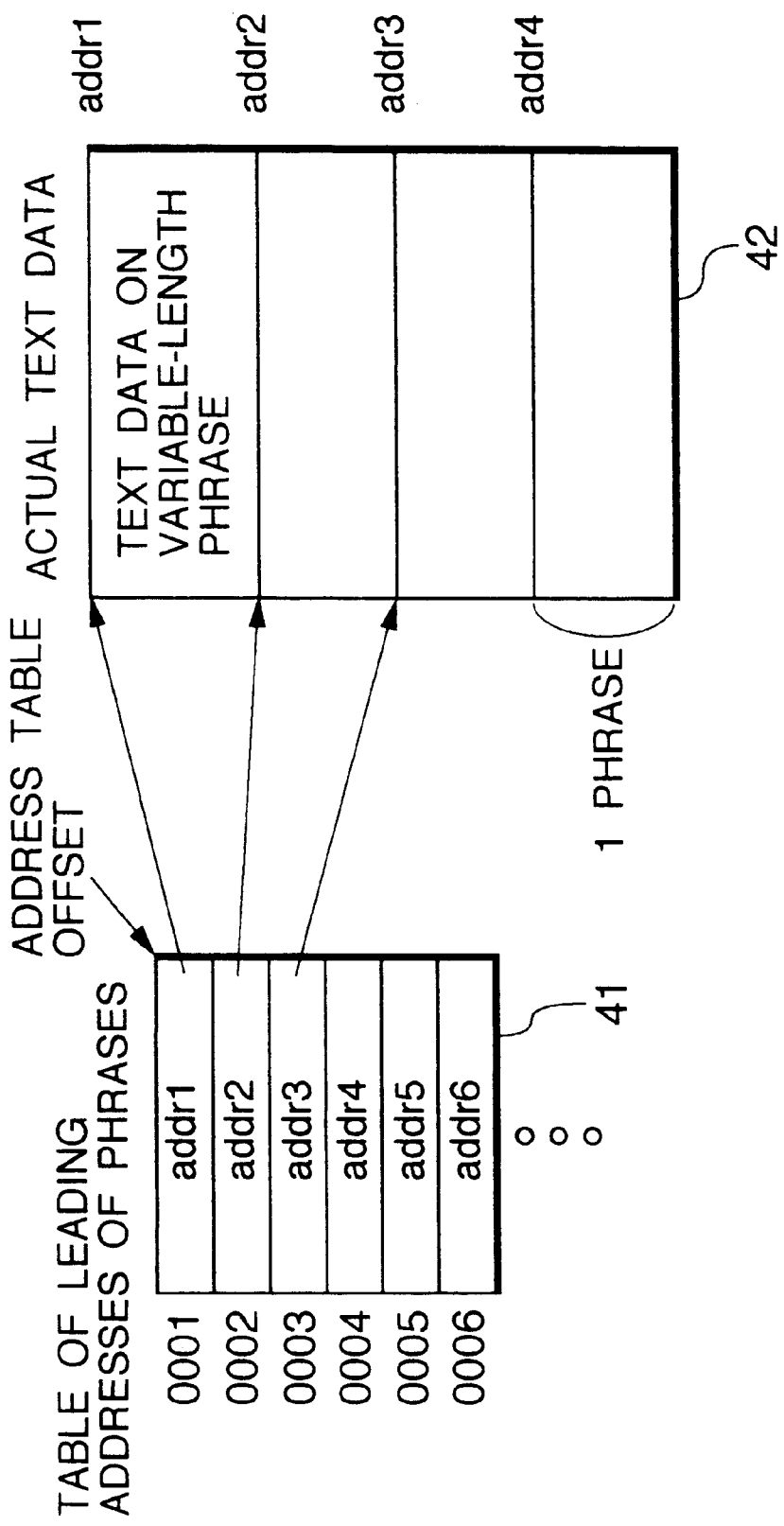

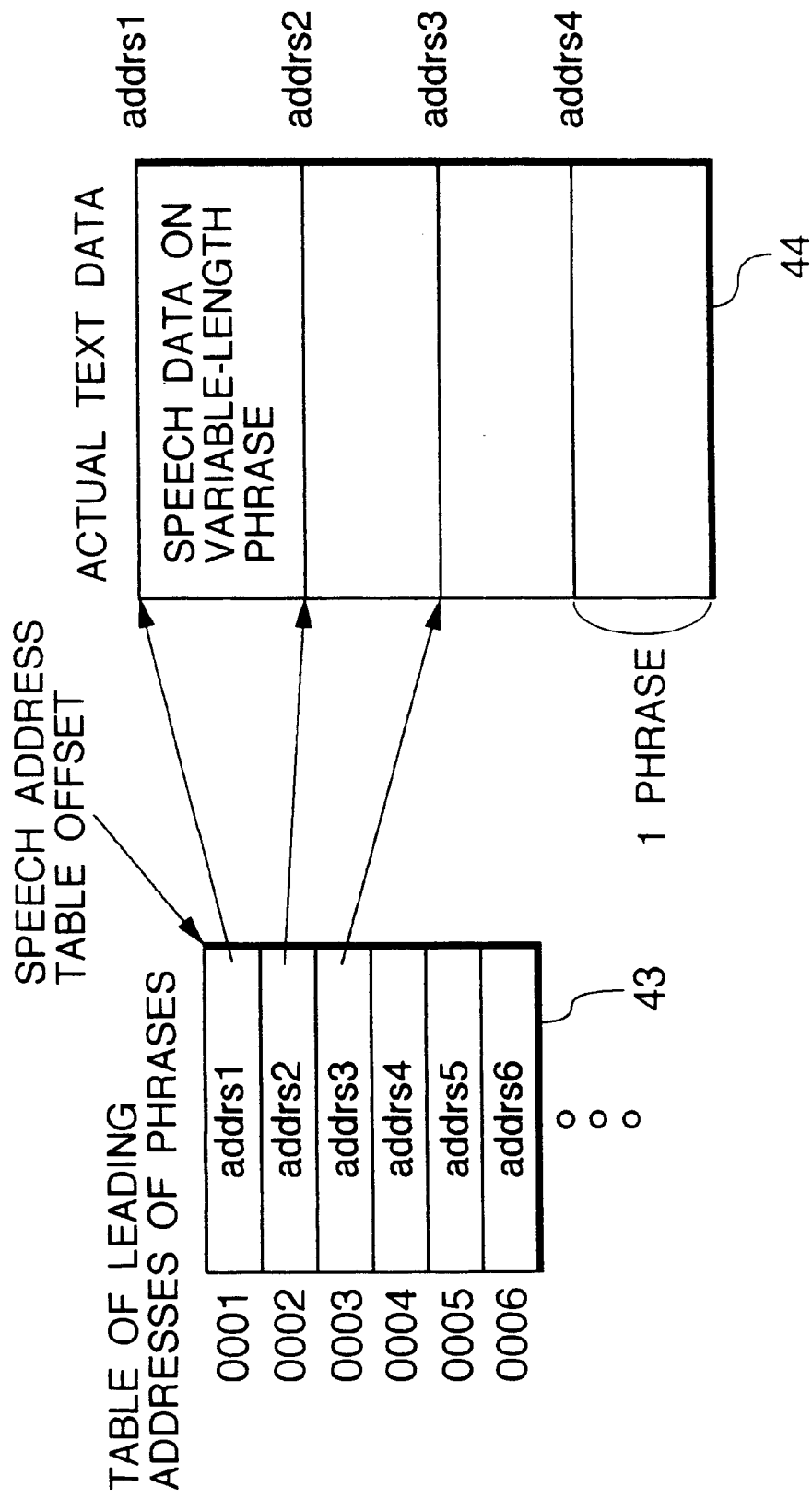

FIG. 8

| PUSHBUTTON DIAL SIGNAL | BINARY CODE | | | |
|---|---|---|---|---|
| | $D_3$ | $D_2$ | $D_1$ | $D_0$ |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 0 | 1 | 0 | 1 | 0 |
| * | 1 | 0 | 1 | 1 |
| # | 1 | 1 | 0 | 0 |
| A | 1 | 1 | 0 | 1 |
| B | 1 | 1 | 1 | 0 |
| C | 1 | 1 | 1 | 1 |
| D | 0 | 0 | 0 | 0 |

FIG. 11A
TABLE OF LEADING ADDRESSES OF CATEGORIES
FIG. 11B
PHRASE DATA SECTION
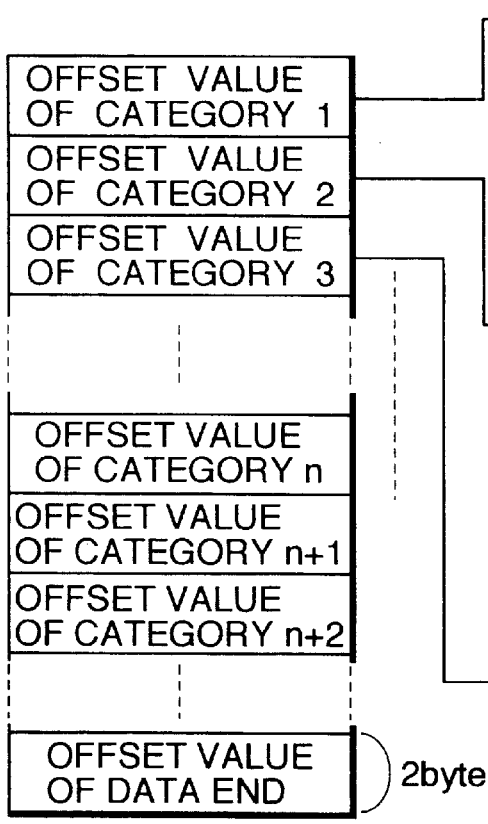
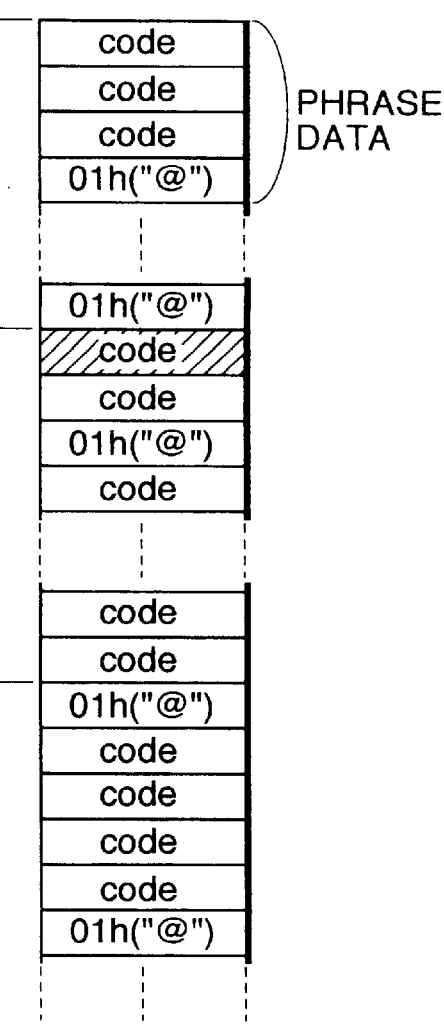

INTERACTIVE SYSTEM PROVIDING LANGUAGE INFORMATION FOR COMMUNICATION BETWEEN USERS OF DIFFERENT LANGUAGES

BACKGROUND OF THE INVENTION

1. Field of the Invention

The present invention relates to a language-information providing apparatus by which phrases or sentences in a predetermined language in, for instance, Japanese, English, or Korean are displayed on a display unit or outputted as voice outputs.

2. Description of the Related Art

A. Language Translating Apparatus

Conventionally, language translating apparatuses are known in which various information in a plurality of languages such as Japanese and English is stored in advance in memory, and which are capable of displaying desired phrases or sentences (collectively referred to herein and in the appended claims as phrases) in a desired language by the key operation by the user or outputting the same in the form of voice, and capable of translating particular phrases into another language. Since there are very numerous phrases used in various scenes, general language translating apparatuses are so arranged that a category (attribute) or a keyword is first selected, and a phrase is then selected.

The "category" referred to here mainly means a place or a situation in which the phrase is used, such as "ie (house)," "resutoran (restaurant)," and "kotsu (transportation)." For example, if "ie (house)" is selected as the category, it is possible to retrieve various phrases used mainly in a private house. Hereafter, such a form of retrieval will be referred to as the "category retrieval." In addition, the "keyword" means a principal word or the like in a phrase. For example, if a keyword "toire (bathroom/rest room)" is selected, it is possible to retrieve phrases concerning "toire," such as "Toire wa dochira desho ka? (Where is the bathroom/rest room?)." Such a form of retrieval will be hereafter referred to as the "keyword retrieval."

Here, even if phrases in Japanese are identical, there are cases where different phrases are used in accordance with the category depending on a foreign language. For instance, in a case where "toire" is translated into English, if the category is "lie (house)," the translated word is "bathroom," while in the category such as "resutoran (restaurant)," the translated word is "rest room." The Japanese word "seki" in "Madogiwa no seki wo onegai shimasu. (I'd like a window table/seat, please.)" is translated as "table" in the case of "resutoran (restaurant)" and "seat" in the case of "kotsu (transportation)."

To avoid the misuse of different phrases in accordance with such categories, if the category retrieval has been effected, a phrase corresponding to the selected category is naturally outputted. In addition, if the keyword retrieval has been effected, translated sentences corresponding to various categories are displayed, and notes such as "(ie de) (in a house)" or "(resutoran de) (in a restaurant)" are displayed.

B. Communication Apparatus

An apparatus disclosed in Japanese Patent Application Laid-Open No. 84554/1994 is known as an apparatus which allows users who are located in mutually remote places to communicate with each other by a method other than voice. The invention disclosed therein is arranged such that a calling party presses pushbuttons on the basis of relationships of correspondence between predetermined sentences and numbers so as to generate a dual tone multifrequency (DTMF) signal, while the receiving party converts the received DTMF signal into a number, and a sentence is displayed on the basis of the relationship of correspondence between the relevant sentence and the number, thereby allowing deaf-and-dumb persons to communicate with each other over the phone.

However, with the above-described conventional language translating apparatus, although it is possible to display a designated phrase in one's own apparatus, or translate and display the designated phrase on the spot or output the translated phrase in the form of voice, it is impossible to provide communication in different languages between uses located in mutually remote places.

In addition, in the invention disclosed in Japanese Patent Application Laid-Open No. 84554/1994, it is necessary for the transmitting side to recognize in advance the relationships of correspondence between the sentences and the numbers, and a special reference table or the like is required. In addition, since the communication is dependent upon the recognition of the relationships of correspondence by the transmitting party, there are naturally limits to the sentences which can be transmitted. Further, although it is desired to provide positive communication in different languages between uses located in mutually remote places, there has been no apparatus which is capable of coping with such a need.

SUMMARY OF THE INVENTION

In view of the above-described circumstances, an object of the present invention is to provide a language-information providing apparatus which is capable of easily transmitting a sentence displayed on the apparatus by making use of, for example, a telephone line.

Another object of the present invention is to provide a language-information providing apparatus which is capable of providing positive communication between users having different languages as their mother tongues and located in mutually remote places, by making use of a telephone line or the like.

Still another object of the present invention is to provide a language-information providing apparatus which is capable of recognizing that a phase being displayed is one which has been received from the other party's apparatus when effecting communication with a user in a remote place.

A further object of the present invention is to provide a language-information providing apparatus in which phrases of high frequency of use are not retrieved from memory on each occasion, but are inputted directly by using independent keys, thereby obtaining instantaneity in response and reducing the communication time.

A still further object of the present invention is to provide a language-information providing apparatus which makes it possible to reduce the communication cost to a low level.

To overcome the above-described problems, in accordance with an arrangement according to a first aspect of the invention, there is provided a language-information providing apparatus comprising: phrase storage means for storing a plurality of phrases each expressed in a plurality of languages; language designating means for designating a particular language among the plurality of languages; phrase selecting means for selecting the phrases stored in the phrase storage means; phrase output means for outputting the phrase in the language designated by the language designating means among the phrases selected by the phrase selecting means; and transmitting means for transmitting phrase information for specifying a phrase selected by the phrase selecting means.

In accordance with an arrangement according to a second aspect of the invention, there is provided a language-information providing apparatus comprising: phrase storage means for storing a plurality of phrases each expressed in a plurality of languages; language designating means for designating a particular language among the plurality of languages; receiving means for receiving phrase information for specifying any one of the plurality of phrases; and output means for outputting the phrase specified by the phrase information, in the language designated by the language designating means.

In accordance with an arrangement according to a third aspect of the invention, there is provided a language-information providing apparatus comprising: phrase storage means for storing a plurality of phrases expressed in a predetermined language; receiving means for receiving phrase information for specifying any one of the plurality of phrases; phrase designating means for designating any one of the plurality of phrases; and output means for outputting the phrase specified by the phrase information, while differentiating the phrase from the phrase designated by the phrase designating means.

In accordance with an arrangement according to a fourth aspect of the invention, there is provided a language-information providing apparatus comprising: phrase storage means for storing a plurality of phrases expressed in a predetermined language; designating means for individually designating a phrase of a high frequency of use among the plurality of phrases; and transmitting means for transmitting phrase information for specifying the phrase designated by the designating means.

In accordance with an arrangement according to a fifth aspect of the invention, there is provided a language-information providing apparatus comprising: phrase storage means for storing a plurality of phrases expressed in a predetermined language and classified by a plurality of attributes; attribute designating means for designating any one of the plurality of attributes; phrase designating means for designating an arbitrary phrase among the phrases having the attribute designated by the attribute designating means; and transmitting means for transmitting the phrase information for specifying the designated phrase.

In accordance with an arrangement according to a sixth aspect of the invention, there is provided a language-information providing apparatus according to the fifth aspect of the invention, wherein the phrase storage means stores the plurality of phrases for each of the attributes.

In accordance with an arrangement according to a seventh aspect of the invention, there is provided a language-information providing apparatus comprising: output means for outputting a phrase or word relating to a predetermined keyword if the keyword is designated; recognizing means for recognizing attributes to which the phrase or word outputted by the output means belongs; display means for displaying the recognized attributes; designating means for designating a particular attribute among the attributes displayed by the display means; and transmitting means for transmitting the phrase having the attribute designated by the designating means.

In accordance with an arrangement according to an eighth aspect of the invention, there is provided a language-information providing apparatus comprising: storage means for storing phrases and/or words; receiving means for receiving data for specifying any one of the phrases or words; attribute detecting means for detecting an attribute of the specified phrase or word; and display means for displaying the specified phrase or word and displaying the detected attribute.

In accordance with an arrangement according to a ninth aspect of the invention, there is provided a language-information providing apparatus according to the eighth aspect of the invention, wherein the display means automatically changes over the attribute being displayed to an attribute corresponding to a new phrase or word if the phrase or word being displayed is updated to the new phrase or word.

In accordance with an arrangement according to a tenth aspect of the invention, there is provided a language-information providing apparatus comprising: phrase storage means for storing phrases and/or words; communicating means for transmitting or receiving data specifying the phrase or word; communication-content storage means for storing the transmitted or received phrase or word communicated; and output means for reading out a content of communication from the communication-content storage means, as required, and outputting the same.

In the arrangement according to the first aspect of the invention, a plurality of kinds of phrases having an identical meaning in a plurality of languages are stored in the phrase storage means. A particular phrase in a particular language is selected by the storage means upon designation of a language and a phrase by the user. The selected phrase is outputted on a display or the like in the language designated by the user, while phrase information for specifying the particular phrase is transmitted to another party's apparatus. Thus, a conversation is possible in the language which one wishes to use. In particular, if the phrase information is transmitted, the user is capable of engaging in remote communication irrespective of the mother tongue of the other party's apparatus.

In the arrangement according to the second aspect of the invention, when the phrase information for specifying a particular phrase is received from the other party's apparatus or the like in a state in which a particular language has been selected by the designation of the language by the user, the particular phrase in the particular language is selected from the phrase storage means, and the selected phrase is outputted to the display or the like. Accordingly, the user of the receiver is capable of freely selecting a conversational language and engaging in communication irrespective of the mother tongue of the transmitter.

In addition, in the arrangement according to the third aspect of the invention, when phrase information specifying a certain phrase is received from the other party's apparatus or the like, the phrase corresponding to the information is selected from the storage means, and is outputted. Meanwhile, for example, a " " mark displayed at the head of the phrase, so that the phrase can be outputted by being differentiated from a phrase selected by the operator himself or herself. Thus, it is possible to clarify the fact that the phrase is a received phrase.

In the arrangement according to the fourth aspect of the invention, an independent key different from the one normally used for designating phrases is provided with respect to the designation of phrases having a high frequency of use, such as YES and NO. Hence, the user is capable of instantaneously transmitting a phrase by pressing such an independent key.

In the arrangement according to the fifth aspect of the invention, if some attribute is designated by the attribute designating means, an arbitrary phrase can be designated among the phrases having that attribute, by using the phrase designating means. Since the scope of a desired phrase can thus be narrowed down by the designation of the attribute, the phase can be selected speedily.

Furthermore, in the arrangement according to the sixth aspect of the invention, since the phrases are stored in units of attributes, if the location where the phrases are stored is clarified, the attribute can be obtained immediately.

In the arrangement according to the seventh aspect of the invention, if the user designates a predetermined keyword, the output means outputs the phrase or word relating to that keyword. In addition, the recognizing means recognizes the attributes to which the phrase or word outputted by the output means belongs. The designating means designates a particular attribute among the attributes designated by the display means, and the transmitting means transmits a phrase having the attribute designated by the designating means.

In the arrangement according to the eighth aspect of the invention, when the receiving means receives data specifying some phrase or word, the display means displays the specified phrase or word, and also displays the attribute to which the specified phrase or word belongs.

In the arrangement according to the ninth aspect of the invention, when the phrase or word being displayed is updated to a new one, the display means automatically changes over the attribute being displayed to an attribute corresponding to the new phrase or word.

In the arrangement according to the tenth aspect of the invention, the communication means transmits or receives data for specifying a phrase or word, while the communication-content storage means stores the communicated phrases or words. Then, the output means reads out the content of communication from the communication-content storage means, as required, and outputs the same.

The nature, utility and principle of the invention will be more clearly understood from the following detailed description and the appended claims when read in conjunction with the accompanying drawings.

BRIEF DESCRIPTION OF THE DRAWINGS

In the drawings:

FIGS. 3A to 3C are diagrams explaining a phrase-information storage format in accordance with the first embodiment of the present invention;

FIGS. 4A and 4B are explanatory diagrams illustrating the configuration of text data in accordance with the first embodiment of the present invention;

FIGS. 5A and 5B are explanatory diagrams illustrating the configuration of speech data in accordance with the first embodiment of the present invention;

FIG. 8 is a diagram explaining the relationship of correspondence between tone dial signals and binary codes used in first and second embodiments of the present invention;

FIGS. 11A and 11B are memory maps of an essential portion of a ROM 113 in accordance with the second embodiment of the present invention;

Figure 1:
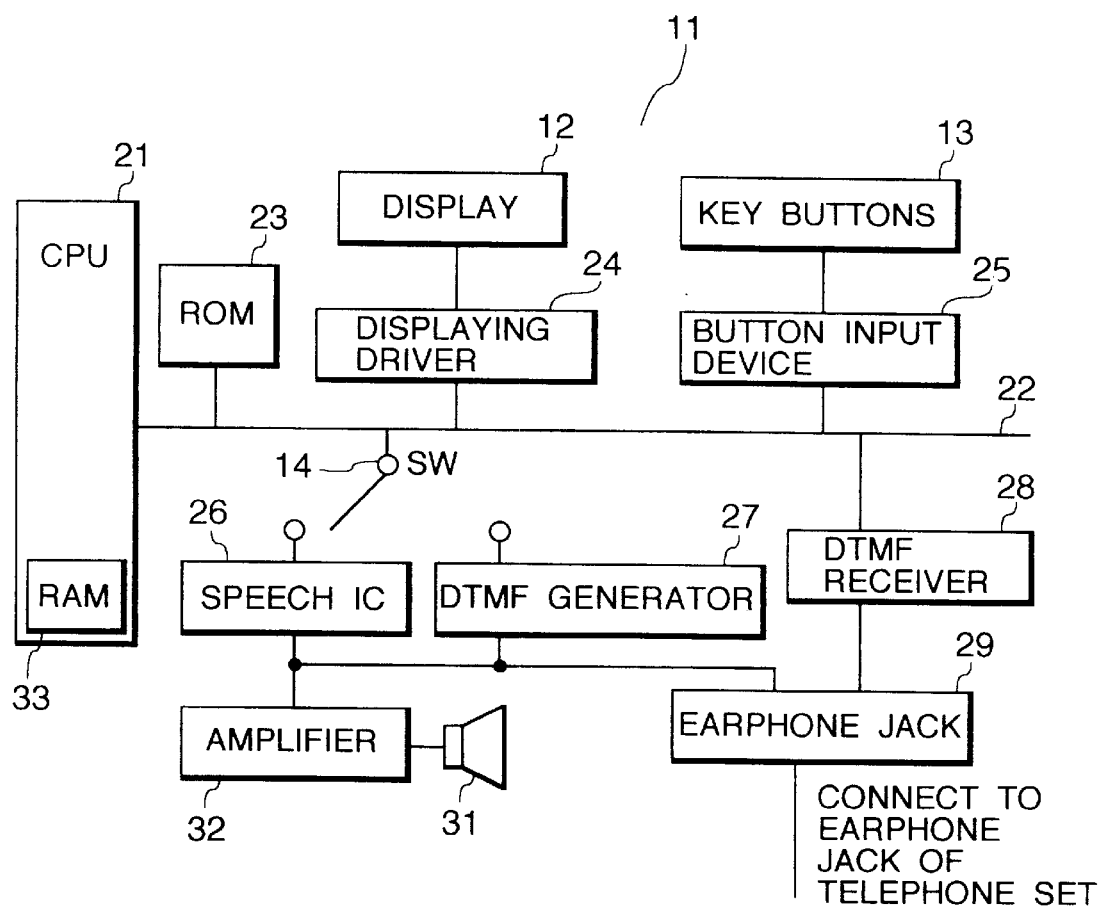
FIG. 1 is a schematic diagram of hardware illustrating an outline of a circuit configuration in accordance with a first embodiment of the present invention.

DETAILED DESCRIPTION OF THE PREFERRED EMBODIMENTS (First Embodiment)

Referring now to the drawings, a description will be given of a first embodiment of the present invention.

Figure 2:
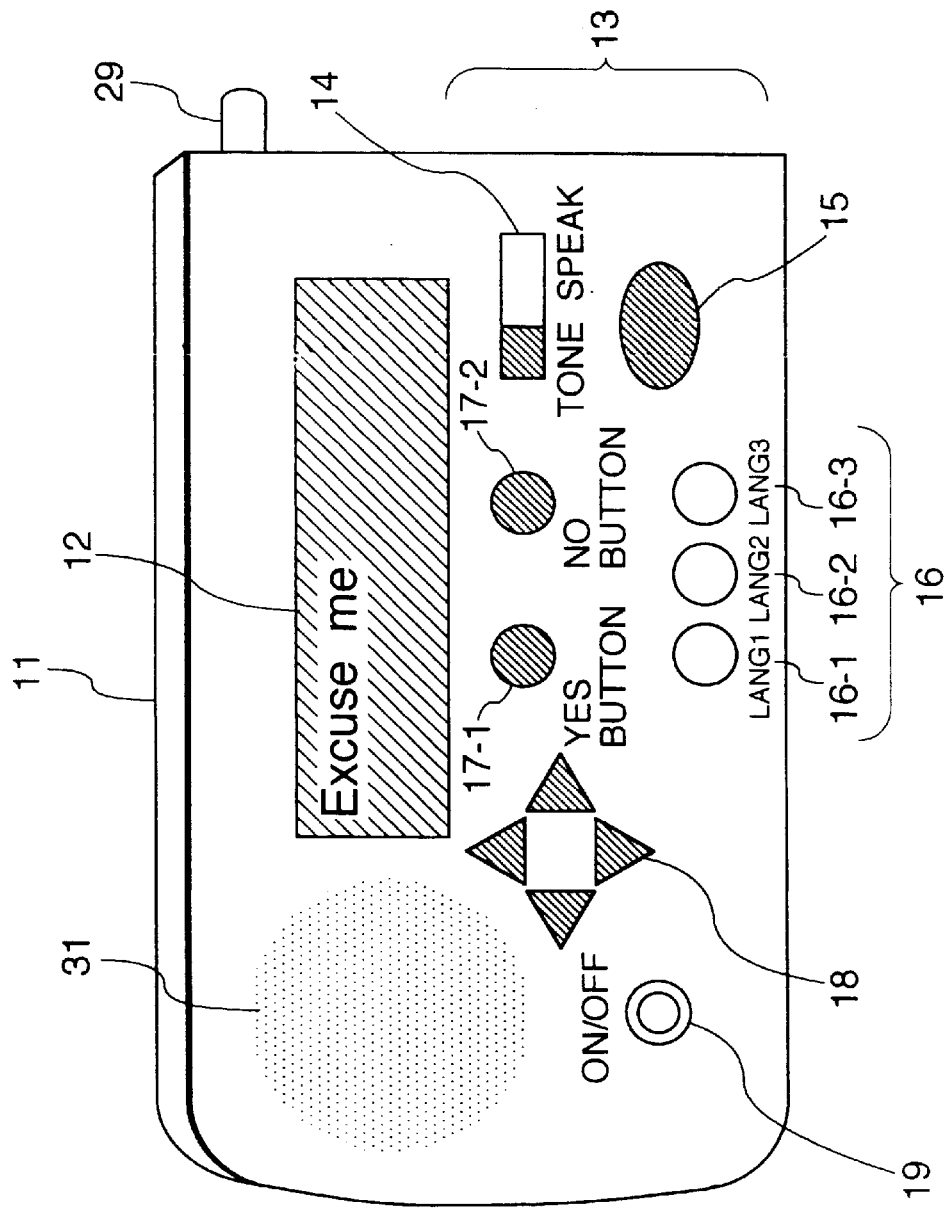
FIG. 2 is a diagram illustrating an operation panel of a language-information processing apparatus in accordance with the first embodiment of the present invention.

FIG. 2 is a diagram illustrating an operation panel of the language-information providing apparatus in accordance with the first embodiment of the present invention. This language-information providing apparatus 11 is an apparatus which has been developed to effect communication between different languages. Sets of phrases in Japanese, English, Chinese, and the like are stored in the apparatus, and the apparatus is capable of displaying a designated phrase in a designated language on a liquid-crystal display 12 provided on a main body. In addition, voice in a designated language can be outputted from a speaker 31, or communication is possible with a user in a remote place by the use of an earphone jack 29 by making use of a telephone line or the like, as required.

To attain these functions, the language-information providing apparatus 11 is provided with key buttons 13 consisting of various switches and buttons. As the key buttons 13, a power switch 19 for turning the power on and off is disposed on an upper surface of the main body, and up/down left/right scroll buttons 18 for scrolling the screen displayed on the display 12 up and down or left and right are arranged in the vicinities of the display 12. Further provided are language selection buttons 16 consisting of buttons 16-1 to 16-3 for designating languages to be outputted; a YES button 17-1 and a NO button 17-2 capable of independently instructing yes and no which are simple phrases; a tone/speak changeover switch 14 for effecting a changeover as to whether a phrase is to be outputted as voice by means of the speaker 31 or it is to be outputted as a tone to the user in a remote place by means of the earphone jack 29; and a transmit/voice button 15 for instructing an output in voice or transmission.

FIG. 1 is a schematic diagram of hardware illustrating an outline of a circuit configuration in such a language-information providing apparatus. In FIG. 1, the language-information providing apparatus 11 has a central processing unit (CPU) 21 for accomplishing a central function in various control. The CPU 21 has a random-access memory (RAM) 33 in which phrase numbers for instructing specific phrases from various phrases stored in a read-only memory (ROM) 23 (which will be described later) and which performs various arithmetic processing. In addition, the CPU 21 is connected via a system bus 22 to the ROM 23, a displaying driver 24, a button input device 25, the tone/speak changeover switch 14, and a dual tone multifrequency (DTMF) receiver 28, respectively.

Here, the ROM 23 is a read-only memory in which a program for effecting various control of the language-information providing apparatus 11, as well as various phrases, speech data for voice output, and the like, are stored. The displaying driver 24 is a drive circuit for displaying on the liquid-crystal display 12 phrases in Japanese, English, Chinese, and the like and other predetermined data. The button input device 25 is a circuit for fetching input data from various switches, such as the tone/speak changeover switch 14 and the like, as well as the key buttons 13 consisting of various buttons, such as the language selection buttons 16-1 to 16-3.

The tone/speak changeover switch 14 is a switch for effecting a changeover between a speech IC 26 and a DTMF generator 27 according to the user's instruction. Here, the speech IC 26 is an integrated circuit for outputting a voice signal on the basis of speech data stored in a part of the ROM 23 in correspondence with each phrase. The voice signal from the speech IC 26 is amplified by an amplifier 32, and is outputted from the speaker 31.

In a case where the user is desirous to effect communication through voice with another party who is located in a remote place, the voice outputted from the speaker 31 is connected as it is to the receiver of a telephone set, thereby easily permitting smooth communication. The DTMF generator 27 is a circuit for converting into a push tone a code prepared by the operation in the RAM 33 located in the CPU 21 from an address number corresponding to each phrase in the ROM 23. The push tone from the DTMF generator 27 is connected to an earphone jack of an unillustrated telephone set via the earphone jack 29, and is transmitted to a receiver by making use of the calling function of the telephone set.

The DTMF receiver 28 is a circuit which receives the push tone from the earphone jack 29 by means of an unillustrated telephone set, converts the same into a code, and outputs the code to the system bus 22. The outputted code is converted into a phrase number corresponding to the respective phrase stored in the ROM 23 by the operation in the RAM 33 disposed in the CPU 21.

FIGS. 3A to 3C are diagrams illustrating a configuration for preparing a database of phrases stored in the ROM 23. As shown in FIG. 3A, phrase numbers are arranged in the ROM 23, and Japanese phrases such as those shown in FIG. 3B and English phrases such as those shown in FIG. 3C are also arranged therein in correspondence with these phrase numbers. Namely, in this embodiment, Japanese phrases and English phrases having identical meanings are arranged in correspondence with the respective phrase numbers. For instance, a Japanese word "hai" and an English word "Yes." correspond to a phrase number 0001. Here, in this embodiment, corresponding phrases are given in two kinds of languages, but the correspondence may be provided by three or more kinds of languages.

FIGS. 4A and 4B are diagrams illustrating a configuration of text data in accordance with this embodiment. As shown in FIG. 4A, a table 41 of leading addresses of phrases is arranged in the ROM 23, and leading addresses of actual text data on the respective phrases are stored therein. As shown in FIG. 4B, text data on variable-length phrases are stored in an area 42 for storing the actual text data in the ROM 23. That is, since the lengths of individual phrases are not fixed, the length of the phrase text data is made variable.

FIGS. 5A and 5B are diagrams illustrating a configuration of speech data in accordance with this embodiment. In a manner similar to that of the above-described configuration of text data, a table 43 of leading addresses of phrases is arranged in the ROM 23 as shown in FIG. 5A, and leading addresses of actual text data on the respective phrases are stored therein. Speech data on variable-length phrases are stored in an area 44 for storing actual text data in the ROM 23, as shown in FIG. 5B. That is, since the lengths of individual phrases are not fixed, the length of the phrase speech data is made variable in the same way as the above-described text data.

Next, referring to a flowchart, a description will be given of the operation of the CPU 21 in a case where communication is effected with another party in a remote place by using the above-described apparatus. It should be noted that, as methods of selecting phrases in this embodiment, the keyword retrieval and the category retrieval are possible. These methods are similar to those of the conventional art.

Figure 6:
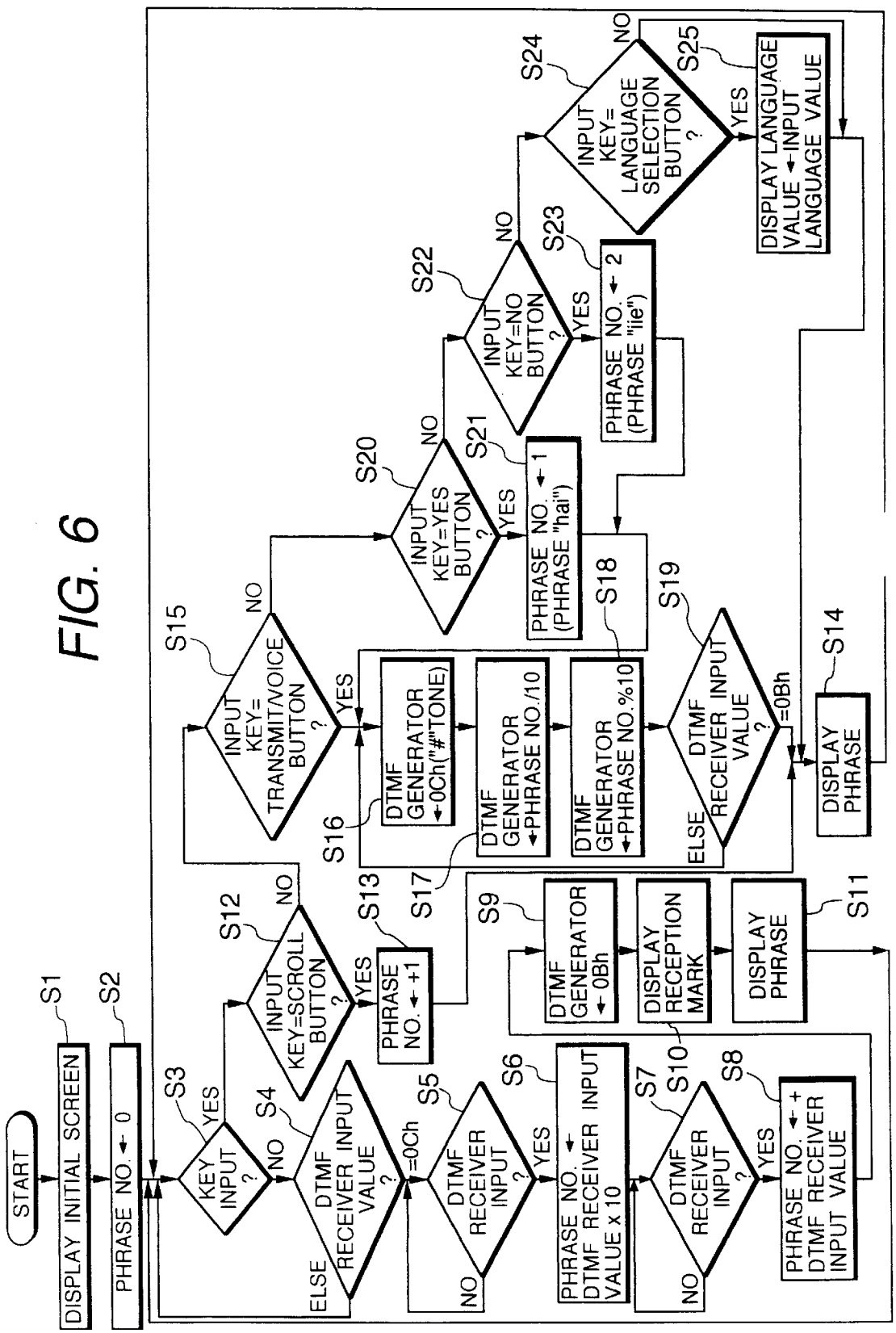
FIG. 6 is a diagram illustrating a flowchart of the operation in accordance with the first embodiment of the present invention.

FIG. 6 shows a flowchart illustrating the operation of the CPU 21 in a case where two apparatuses are connected to each other via a telephone line. First, an initial screen indicating that power is on is displayed on the display 12 when the power is turned on (Step S1). As a state in which no phrase is instructed, a 0 is written in the RAM 33 of the CPU 21 as a memory value of the phrase number (Step S2). In this state, the operation waits for a key input or a push tone input, and a loop for waiting for an input is depicted until an input from the key buttons 13 or a push tone from the DTMF receiver 28 is received (Steps S3, S4).

Next, when a fixed tone "#," i.e., 0Ch, representing a phrase start is inputted to the DTMF receiver 28 in a state in which there is no key input, it is assumed that phrase information has been transmitted from the other party, so that the operation waits for a subsequent input to the DTMF receiver 28 (Step S5). If there is an input, an input value to the DTMF receiver 28 is written in the RAM 33 as the tens digit of the phrase number (Step S6).

The operation waits for a still further input to the DTMF receiver 28 (Step S7), and if there is an input, an input value to the DTMF receiver 28 is written in the RAM 33 as the units digit of the phrase number (Step S8), thereby establishing the phrase number. When the phrase number is thus established, a fixed tone "*," i.e., 0Bh, representing the confirmation of reception is outputted to the DTMF generator 27 so as to send the confirmation to the other party's apparatus (Step 9).

As the reception confirmation tone is transmitted to the other party's apparatus, the other party's apparatus is capable of confirming the reception, permitting smooth communication. At this time, a specific reception mark indicating that the phrase is received data is displayed in front of the phrase on the display 12 (Step S10). Following the reception mark, phrase data of the reception phrase number established as described above is fetched from the ROM 23, and is displayed (Step S11). Subsequently, the operation is set again in a state of waiting for a key input or a push tone input (Steps S3, S4).

Next, if any one of the keys is pressed in the state of waiting for a key input in Step S3, a phrase number is determined in accordance with the input key. Here, a determination is made as to whether or not the input key is one of the up/down left/right scroll buttons 18 (Step S12). If the input has been made by one of the up/down left/right scroll buttons 18, the memory value of the phrase number is incremented (Step S13), and an ensuing phrase is displayed (Step S14).

In addition, in Step S12, if the input key is not one of the up/down left/right scroll buttons, a determination is made as to whether or not the input key is the transmit/voice button 15 (Step S15). If the input has been made by the transmit/voice button, "#," i.e., 0Ch, is outputted to the DTMF generator 27 as the fixed tone for a transmission start (Step S16). Next, a value obtained by dividing the phrase number selected at that time by 10, i.e., the tens digit of the phrase number, is outputted to the DTMF generator 27 (Step S17). Subsequently, the remainder obtained by dividing the phrase number selected at that time by 10, i.e., the units digit of the phrase number, is outputted to the DTMF generator 27 (Step S18).

When the outputting of the aforementioned three tones is finished, the fixed tone "*," i.e., 0Bh, representing the confirmation of reception from the other party's apparatus is detected (Step S19). Here, if a reception confirmation tone is not inputted to the DTMF receiver 28, it is assumed that the phrase information has not been transmitted properly, and the three tones shown in Steps S16 to S18 are outputted again. If the reception confirmation tone is detected, the phrase data of the set phrase number is displayed on the screen (Step S14), and the operation is set again in the state of waiting for a key input or a push tone input (Steps S3, S4).

In Step S15, if the input key is not the transmit/voice button 15, a determination is made as to whether or not the input key is the YES button 17-1 (Step S20). If it is not the YES button, a determination is made as to whether or not the input key is the NO button 17-2 (Step S22). If it is determined in Step S20 that the input key is the YES button, the phrase number (in this case, 1) of the phrase data "hai (yes)" is written as the memory value (Step S21), and the relevant phrase number is sent to the other party's apparatus in accordance with the aforementioned Steps S16 to S18.

Meanwhile, if it is determined in Step S22 that the input key is the NO button, the phrase number (in this case, 2) of the phrase data "iie (no)" is written as the memory value (Step S23), and the relevant phrase number is sent to the other party's apparatus in accordance with the aforementioned Steps S16 to S18. If the reception confirmation tone is detected (Step S19), the phrase data of the set phrase number is displayed on the screen (Step S14), and the operation is set again in the state of waiting for a key input or a push tone input (Steps S3, S4).

In Step S22, if the input key is not the NO button, a determination is made as to whether or not the input key is one of the language selection buttons 16 (Step S24). If the input key is one of the language selection buttons, the display language presently being displayed on the basis of the correspondence of phrases in the ROM 23 shown in FIG. 3 is converted to the input language newly inputted (Step S25). If the input key is not one of the language selection buttons, the above language conversion is not effected (Step S24). On the basis of the language designated in Step S24 and Step S25, the phrase data is displayed on the screen (Step S14), and the operation is set again in the state of waiting for a key input or a push tone input (Steps S3, S4).

Next, to facilitate an understanding of this embodiment, a description will be given of operation modes in this embodiment.

FIGS. 7A to 7H are diagrams explaining the operation modes for effecting communication between users in mutually remote places by connecting two apparatuses via a telephone line. Here, in an apparatus 1, for example, Japanese has been selected by pressing the button 16-1 for a language 1 among the language selection buttons 16. Meanwhile, in an apparatus 2, English has been selected by pressing the button 16-2 for a language 2.

FIGS. 7A to 7H show the contents which are displayed on the displays 12 of the apparatuses 1 and 2, by taking into consideration the relationships of correspondence between the apparatuses 1 and 2.

Figure 7:
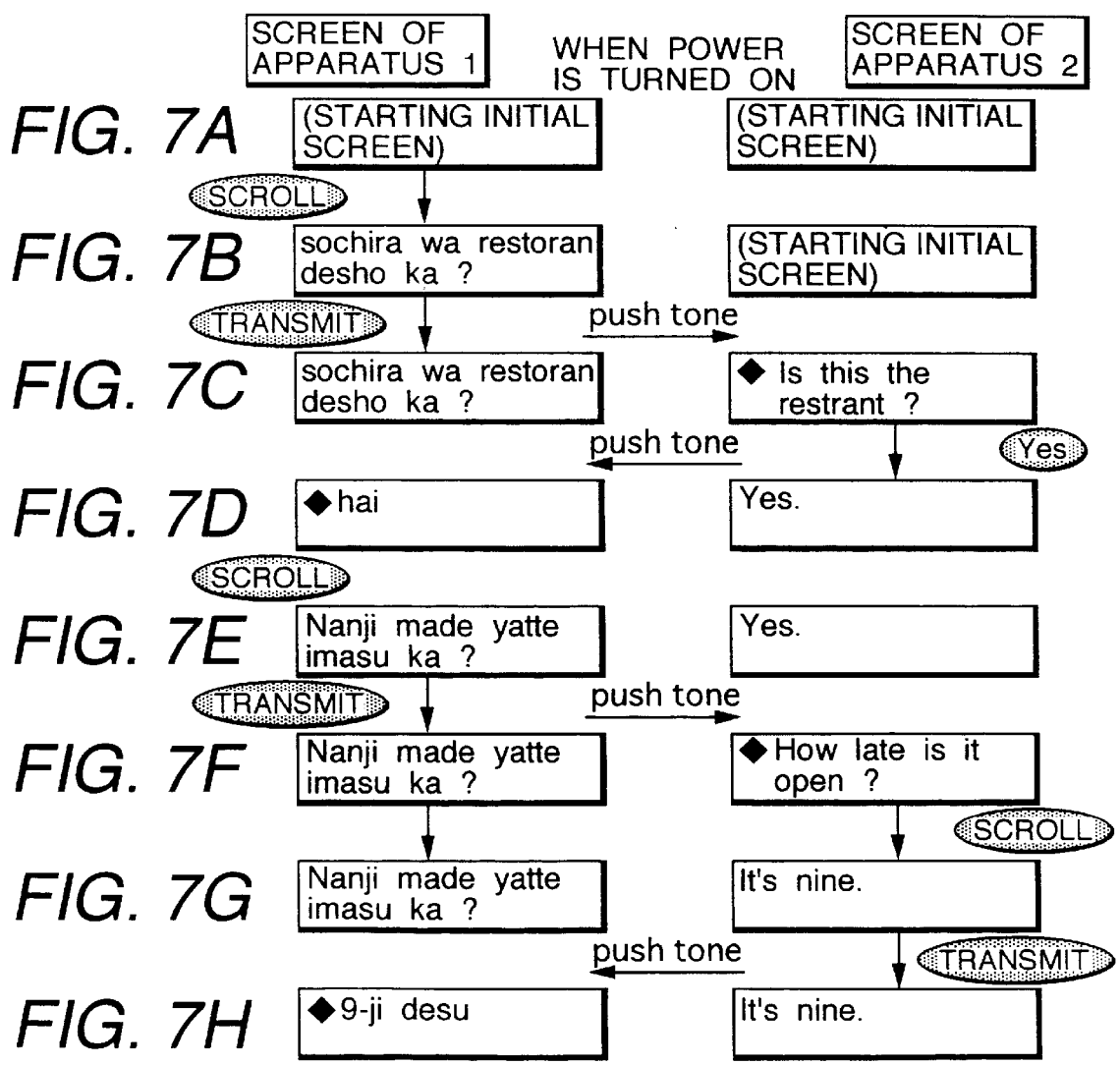
FIGS. 7A to 7H are explanatory diagrams of an operational mode in accordance with the first embodiment of the present invention.

First, the part (a) of FIG. 7 shows the state of an initial screen during starting when the power is turned on. In this state, for example, scene settings for selecting a particular phrase, keywords for mode setting, and the like are displayed.

The next part (b) of FIG. 7 shows a state in which the user of the apparatus 1 has selected a particular phrase by operating the up/down left/right scroll buttons 18, and a phrase "Sochira wa resutoran desho ka? (Is this the restaurant?)," for example, is read as text data from the ROM 23, and is displayed on the display 12. In this state, the screen on the apparatus 2 remains the same as that when the power was turned on, and is in the same state as the starting initial screen.

Here, if the user of the apparatus 1 changes over the tone/speak changeover switch 14 to the tone side, and depresses the transmit/voice button 15, a phrase number corresponding to the phrase is inputted to the DTMF generator 27 from the text data in the ROM 23 via the CPU 21. The DTMF generator 27 converts the inputted phrase number into a push tone, and the push tone is outputted to the apparatus 2 via the earphone jack 29 by making use of the calling function of the unillustrated telephone set connected to the apparatus.

Here, FIG. 8 is a diagram explaining the relationships of correspondence between DTMF tone dial signals used in this embodiment and binary codes. In the dual tone multifrequency (DTMF) which is generally used for the telephone line, 16 combinations of tones are prescribed according to the recommendation by the International Consultative Committee for Telephone and Telegraph (CCITT). These combinations respectively correspond to 16 dial signal characters including the numbers 0 through 9, the symbols * and #, and the characters A, B, C, and D. The DTMF generator 27 converts the 4-bit binary numbers (0 to 15 in the decimal notation) outputted via the CPU 21 into tone dial signals.

In this embodiment, the apparatus is so configured that the pressing of a button causes three tones to be outputted. Of these three constituent tones, a first tone is a fixed tone (here, the "#" tone is used) representing a phrase start, a second tone is that of a numeral at the tens digit of the selected phrase number, and a third tone is that of a numeral at the units digit of the selected phrase number. Incidentally, the tones to be outputted can be made four tones or more depending on the number of the phrases, and if the number of constituent tones is increased, the number of communicatable phrases increases. In addition, if the number of constituent tones is increased, it is possible to transmit and receive additional information such as time information and name information in combination with the fixed phrase information.

Next, FIG. 7C shows a state of display on the display 12 when push tones have been received from the apparatus 1. The push tones are received by the DTMF receiver 28 via the earphone jack 29 by making use of a receiving function of an unillustrated telephone set connected to the apparatus 2 and having an automatic receiving function. Each of the received push tones is converted into a 4-bit binary number by the DTMF receiver 28, and is transmitted to the CPU 21. The CPU 21 converts the signal into a phrase number, and selects a corresponding phrase stored in the ROM 23 and shown in FIG. 3. Here, in the apparatus 2, since English has been selected as described above, an English phrase "Is this the restaurant?" is selected from among the corresponding phrases, and is outputted on the screen.

It should be noted that, in this embodiment, a specific mark " " is displayed in front of the phrase when the display is given. This specific mark is a mark which informs the user of the fact that the phrase is a received phrase. This mark is not limited to the one used in this embodiment, and it suffices if it can be distinguished from a phrase which the user himself or herself selected. For instance, it is possible to use other symbols or an underline or the like. In addition, if there is a sufficient space in the display, it is possible to display the phrase which the user himself or herself selected and the received phrase by using different paragraphs for them. By virtue of such a display, the user is capable of differentiating the phrase which the user himself or herself selected and the phrase which is received from the other party, hereby effecting smooth communicating.

Next, FIG. 7D shows a state of display on the display 12 when the user of the apparatus 2 has replied with respect to the received phrase displayed in FIG. 7C. The user of the apparatus 2 replies on the basis of the received phrase displayed in FIG. 7C, and a reply of YES or NO is possible with respect to that phrase. This apparatus is provided with independent keys, the YES button 17-1 and the NO button 17-2 which are used differently from ordinary phase instructions. Here, if it is assumed that the user of the apparatus 2 presses the YES button 17-1, a phrase number corresponding to YES is transmitted to the other party's apparatus via the DTMF generator 27.

By pressing such an independent key, it is unnecessary for the user to search the phrase by taking the time and trouble of scrolling the screen and to instruct the transmission, so that instantaneous transmission of the phrase becomes possible. During this transmission, the character "Yes." is displayed on the display screen of the apparatus 2. Upon receiving a phrase number corresponding to that phrase YES, the apparatus 1 display the Japanese "Hai." corresponding to that phrase on the display screen. At that time, since that phrase is the one which has been received, the aforementioned specific mark " " is displayed in front of the phrase.

Next, FIG. 7E shows a state of display when the user of the apparatus 1 has replied with respect to the received phrase displayed in FIG. 7D. The user of the apparatus 1 selects, for instance, a phrase "Nanji made yatte imasu ka? (How late is it open?)" by operating the scroll buttons 18, and then presses the tone/speak changeover switch 14, thereby sending a phrase number corresponding to that phrase to the other party's apparatus in the above-described manner.

Next, FIG. 7F shows a state of display when the apparatus 2 has received the phrase number in FIG. 7E from the apparatus 1. In the apparatus 2, the English phrase "How late is it open?" is displayed together with the specific mark "."

Next, FIG. 7G shows a state of display when the user of the apparatus 2 has replied with respect to the received phrase displayed in FIG. 7F. The user of the apparatus 2 selects, for example, a phrase "It's open till nine." by operating the scroll buttons 18, and then presses the tone/speak changeover switch 14, thereby sending a phrase number corresponding to that phrase to the other party's apparatus in the above-described manner.

Next, FIG. 7H shows a state of display when the apparatus 1 has received the phrase number in FIG. 7G from the apparatus 2. In the apparatus 1, the Japanese phrase "9-ji desu. (It's open till nine.)" is displayed together with the specific mark "." In the above-described manner, remote communication in different languages becomes possible.

With the language-information providing apparatus in accordance with the above-described embodiment, a phrase selected freely by the user in a mother tongue or the like can be easily transmitted by making use of a telephone line, and free communication is possible without adherence to the kinds of languages the user of the other apparatus is capable of understanding. In addition, in accordance with this embodiment, since the output to one's own apparatus is displayed on the display 12, communication based on the so-called silent talk becomes possible, so that in cases where a voice output is not appropriate as during a meeting, communication with the other party's apparatus is possible without generating a voice.

(Second Embodiment)

A. Configuration of the Embodiment

Figure 9:
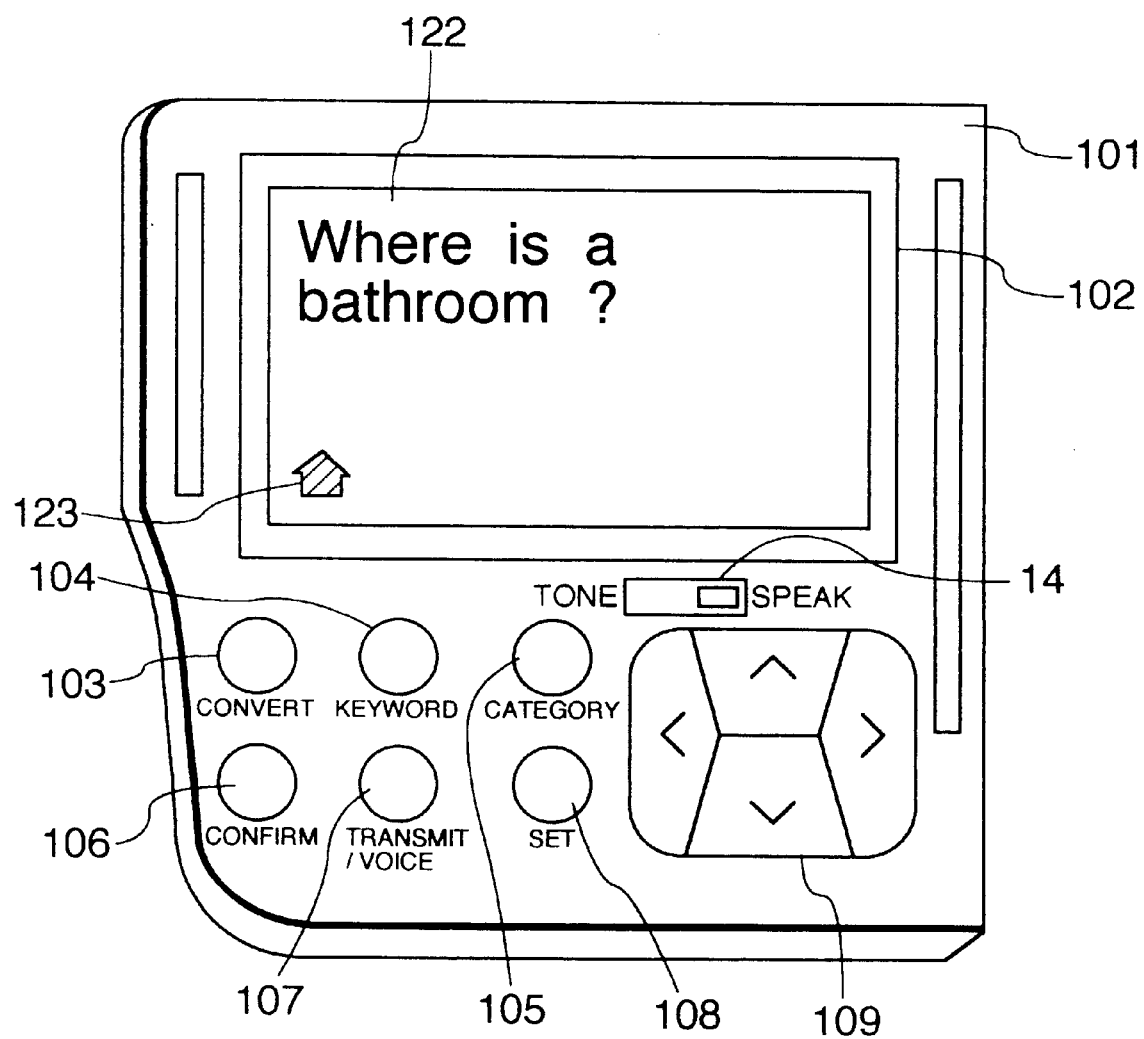
FIG. 9 is a plan view of a portable translating apparatus in accordance with the second embodiment of the present invention.

In FIG. 9, reference numeral 101 denotes a casing which is formed in a substantially flat shape and is adapted to be hand-held by the user. Numeral 102 denotes a display which is comprised of a character displaying portion 122 for displaying characters of such as words and phrases and a category displaying portion 123 for displaying a classification (hereafter referred to as the category) using a pictogram representing, for example, a "house," an "automobile," or the like.

In addition, numeral 103 denotes a language converting button for instruction conversion of the language; 104 denotes a keyword retrieving button for instructing keyword retrieval; 105 denotes a category retrieving button for instructing category retrieval; 106 denotes a reception confirming button for confirming the received phrase; and 107 denotes a transmit/voice button having a function similar to that of the transmit/voice button 15 in the first embodiment. Further, numeral 108 denotes a set button for confirming the content of the instruction; and 109 denotes a cursor button capable of instructing one of up/down and left/right directions. The details of these buttons 103 to 109 and their operation will be described later.

Figure 10:
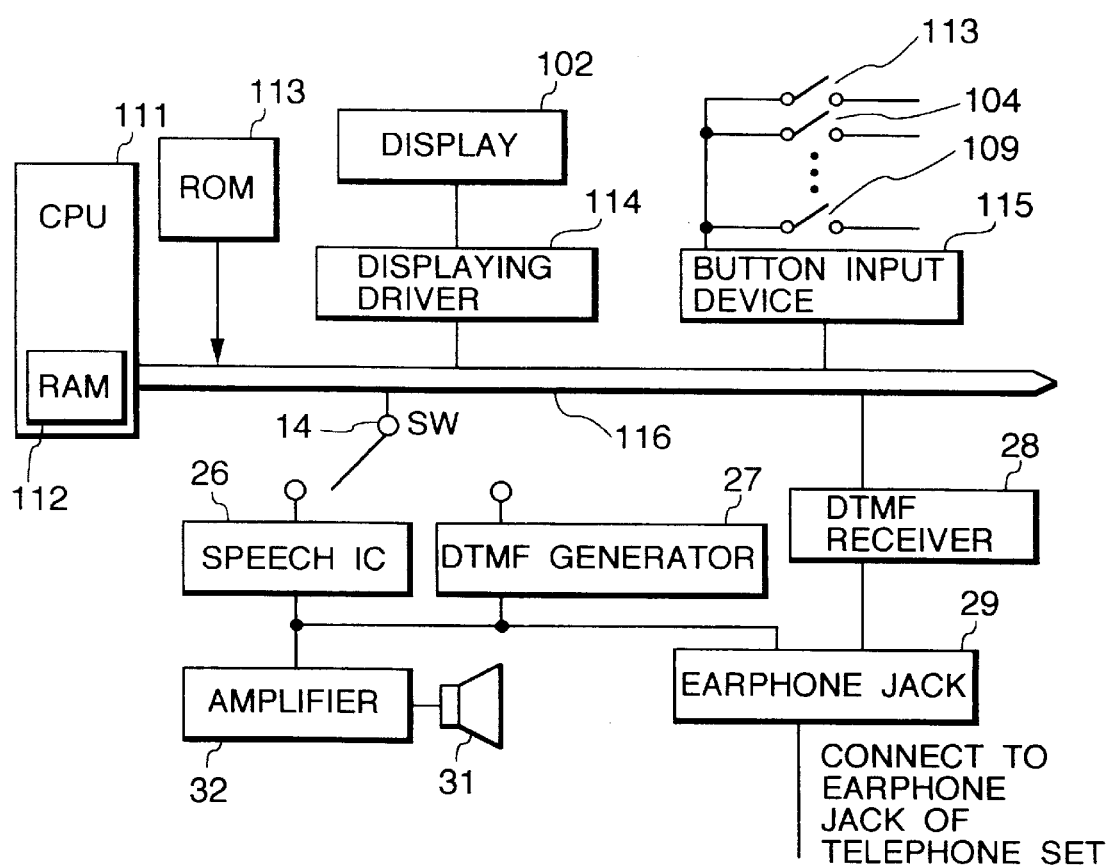
FIG. 10 is a block diagram of the portable translating apparatus in accordance with the second embodiment of the present invention.

Next, a circuit configuration of a portable translating apparatus will be shown in FIG. 10. In the drawing, reference numeral 111 denotes a CPU which incorporates a RAM 112 and controls other constituent elements on the basis of a control program stored in a ROM 113. In addition to the control program, stored in the ROM 113 are text data of words or phrases and speech data or the like. Numeral 114 denotes a displaying driver which displays various information on the display 102 on the basis of the instruction supplied from the CPU 111 via a bus 116.

In addition, numeral 115 denotes button input device which detects the state of operation of the buttons 103 to 109, and supplies the detected result to the CPU 111. Further, in the same way as the apparatus of the first embodiment, the portable translating apparatus in this embodiment is also provided with the tone/speak changeover switch 14, the speech IC 26, the DTMF generator 27, the DTMF receiver 28, the earphone jack 29, the speaker 31, and the amplifier 32.

A-1. Data Structure

Referring next to FIGS. 11A and 11B, a description will be given of the structure of a phrase data section stored in the ROM 113. In FIG. 11B, the respective phrase data is comprised of a code of a character string constituting each phrase and an end mark (01h, @ mark) indicating an end of the phrase. Here, the code of a character string is a number imparted to one or a plurality of parts constituting that phrase. For instance, a phrase "Watashi wa kaishain desu. (I am a company employe.)" is divided into three parts, "Watashi wa (I)" "kaishain (a company employe" and "desu (am)" and is expressed by three codes.

Character codes of character strings (parts) corresponding to the respective codes and speech data for speech (Japanese or English) are stored in other areas of the ROM 113. In addition, the phrase data are arranged in units of categories. That is, leading portions of the phrase data section belong to the category "resutoran (restaurant)," then followed by those belonging to the category "kotsu (transportation)."

Leading addresses concerning the respective categories are stored in the table of leading addresses of categories shown in FIG. 11A. That is, offset values of the leading addresses of categories which respectively correspond to the leading addresses of the phrase data section are stored in the table of leading addresses of categories. Since the respective offset values are expressed by "2" bytes, the size of the table of leading addresses of categories becomes "the total number of categories ×2" bytes.

B. Operation of the Embodiment

Next, a description will be given of the operation of this embodiment.

Figure 12:
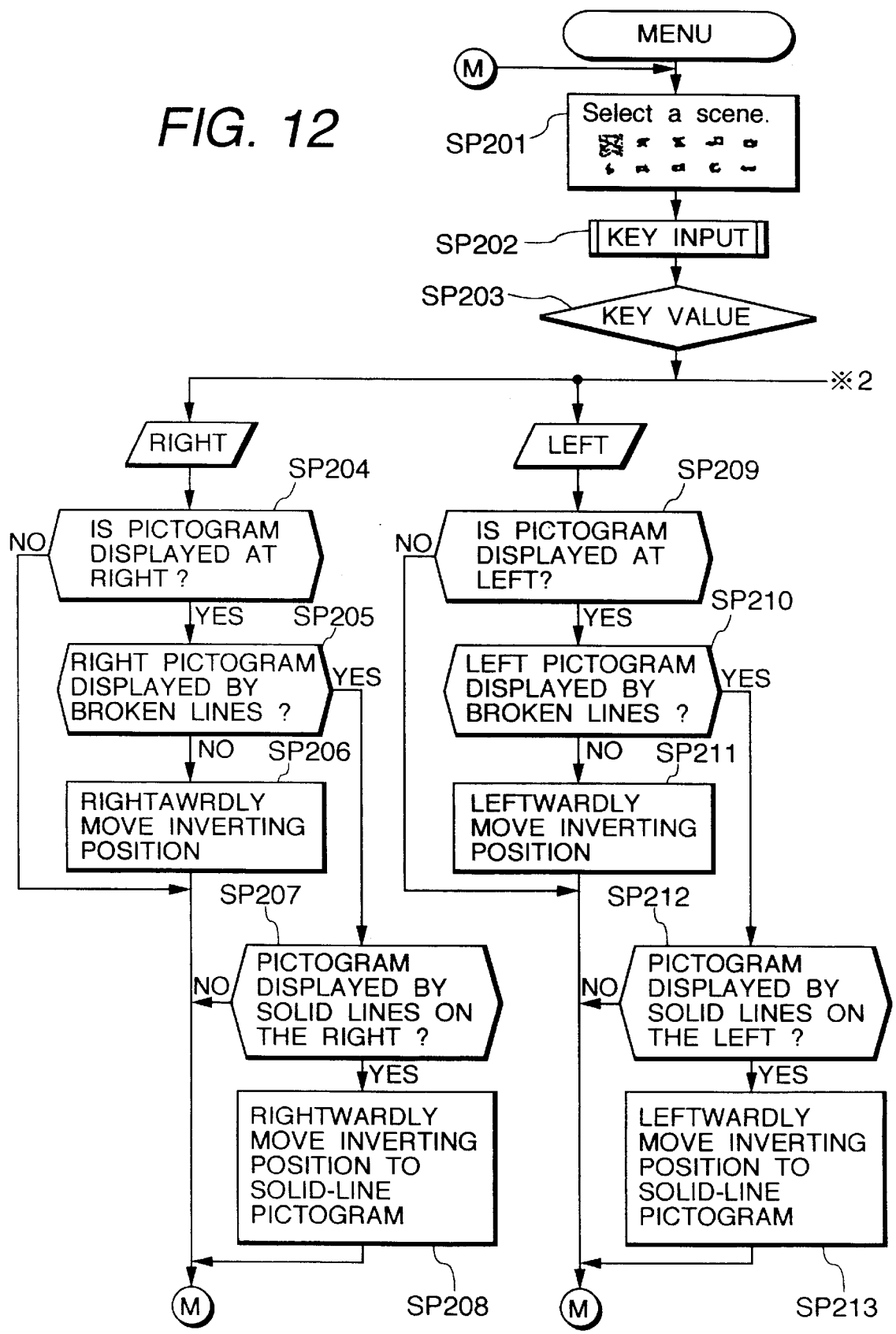
FIG. 12 is a flowchart of a processing program of the portable translating apparatus in accordance with the second embodiment of the present invention.
Figure 13:
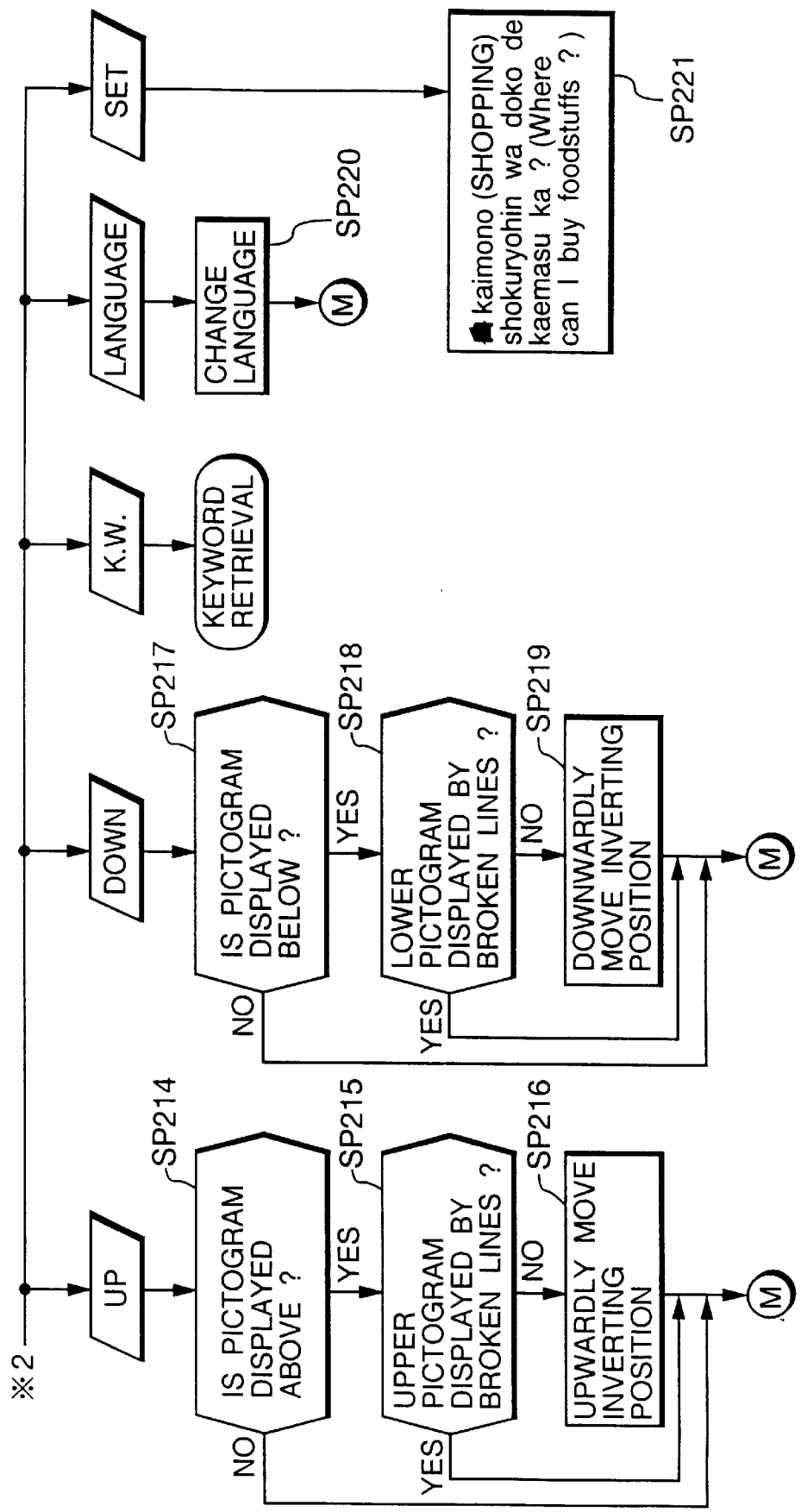
FIG. 13 is a flowchart of the processing program of the portable translating apparatus in accordance with the second embodiment of the present invention.

First, when the power of the portable translating apparatus of this embodiment is turned on, the program shown in FIGS. 12 and 13 is started. In FIG. 12, when the operation proceeds to Step SP201, a selection screen is displayed on the display 102. The selection screen is one in which various pictograms are arranged in two rows and five columns, and a character string "Bamen wo erande kudasai. (Select a scene.)" is displayed above the pictograms.

In the initial state of the selection screen, a cursor is located on a pictogram at an upper left corner. Here, the position of the cursor is indicated by the inversion of the pictogram. The pictograms are normally shown by solid lines, but if they cannot be selected, they are shown by broken lines. Next, when the operation proceeds to Step SP202, the operation waits until one of the buttons is pressed. Then, if one of the buttons is pressed, the operation proceeds to Step SP203, and the following processing is executed in correspondence with the kind of the button pressed.

B-1. When the cursor button 109 is pressed in the selection screen

When the cursor button 109 is pressed, processing in Steps SP204 to SP219 is carried out. That is, the position of the cursor moves in the direction in which the cursor button was pressed, while skipping the pictograms indicated by the broken lines.

B-2. When the language converting button 103 is pressed in the selection screen:

If the pressing of the language converting button 103 is detected in Step SP202, the operation proceeds to Step SP220 to change the language being displayed. That is, if the character string "Bamen wo erande kudasai." was being displayed in Japanese prior to the pressing of the button, the character string "Select a scene." is thereafter displayed in English.

B-3. When the set button 108 is pressed in the selection screen:

If the pressing of the set button 108 is detected in Step SP202, the operation proceeds to Step SP221. Here, a leading phrase of the presently selected scene (the scene corresponding to the pictogram at the cursor position) is displayed on the display 102. Subsequently, phrases can be scrolled by the cursor button 109, making it possible to display a desired phrase. Incidentally, the above processing is similar to the processing in the first embodiment.

Figure 14:
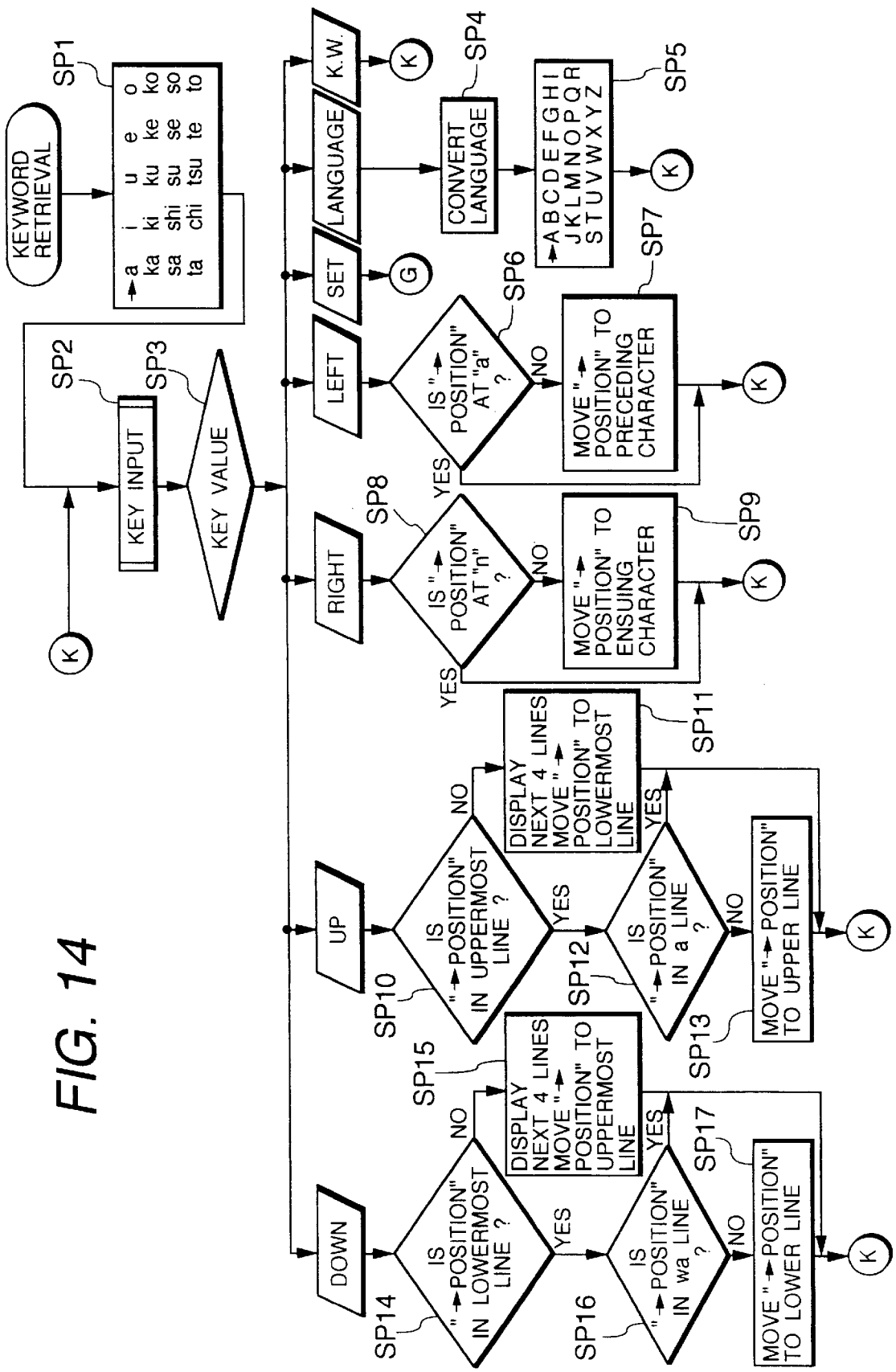
FIG. 14 is a flowchart of the processing program of the portable translating apparatus in accordance with the second embodiment of the present invention.

B-4. When the keyword retrieving button 104 is pressed in the selection screen:

If the keyword retrieving button 104 is pressed, the program shown in FIG. 14 is started. In the drawing, when the operation proceeds to Step SP1, the "a line" through the "ta line" in the hiragana syllabary are displayed on the character displaying portion 122 as an initial character of the keyword in the presently selected language (Japanese in the illustrated example). Then, the cursor position is set on the portion of the character "a." Next, when the operation proceeds to Step SP2, the operation waits until one of the buttons is pressed. When one of the buttons is pressed, the operation proceeds to Step SP3, and the following processing is executed in correspondence with the kind of the button pressed.

(1) When the cursor button 109 is pressed

If the cursor button 109 is pressed, the processing in Steps SP6 to SP17 is carried out. That is, the cursor can be set on an arbitrary hiragana by pressing the cursor button 109 in the up/down or left/right direction. Namely, the user sets the cursor on the initial character of the keyword by the above-described operation. It should be noted that in a case where the keyword is written in kanji, then hiragana, i.e., its Japanese rendering, is used as the initial character. For instance, if Chinese character "seki" is a keyword, the cursor is set on the character "se".

(2) When the language converting button 103 is pressed

Among words of foreign origin and the like which are commonly used in Japan, there are words in which the alphabet is used as an initial character (e.g., CD pureiya (CD player)). In such a case, in this embodiment, the keyword can be retrieved by the alphabet in addition to hiragana. In such a case, the user presses the language converting button 103. If the language converting button 103 is pressed, the operation proceeds to Step SP4 via Step SP3. Here, necessary processing is carried out to display the alphabet on the display 102. Then, when the operation proceeds to Step SP5, all the 26 letters of the alphabet are displayed on the display 102, and then the operation returns to Step SP2.

Also, in the case where the alphabet is displayed, Steps SP6 to SP17 are executed by pressing the cursor button 109 in the up/down or left/right direction, allowing the user to set the cursor on an arbitrary letter. Nevertheless, as shown in Step SP5 in the flowchart, the display 102 is capable of simultaneously displaying all the 26 letters of the alphabet. That is, the contents of display on the display 102 include all the lines including the uppermost line and the lowermost line of the alphabet. Hence, in Steps SP10 and SP14, YES is given as the answer in the determination.

In addition, although not specifically illustrated in the flowchart, in the case where the alphabet is displayed, the determination of the cursor position differs slightly from the case of hiragana. That is, in Step SP6, a determination is made as to whether or not the cursor is to be moved to the position of "A;" in Step SP8, a determination is made as to whether or not the cursor is to be moved to the position of "Z;" in Step SP12, a determination is made as to whether or not the cursor is to be moved to the position of the line "S–Z;" and in Step SP16, a determination is made as to whether or not the cursor is to be moved to the position of the line "A–I." Further, if the language converting button 103 is pressed again in the state in which the alphabet is being displayed on the display 102, Step SP4 is executed again. In that case, the display of the alphabet is returned to the display in hiragana.

(3) When the keyword retrieving button 104 is pressed:

If the keyword retrieving button 104 is pressed, the operation returns to Step SP2. That is, the subsequent operation described above is ignored.

Figure 15:
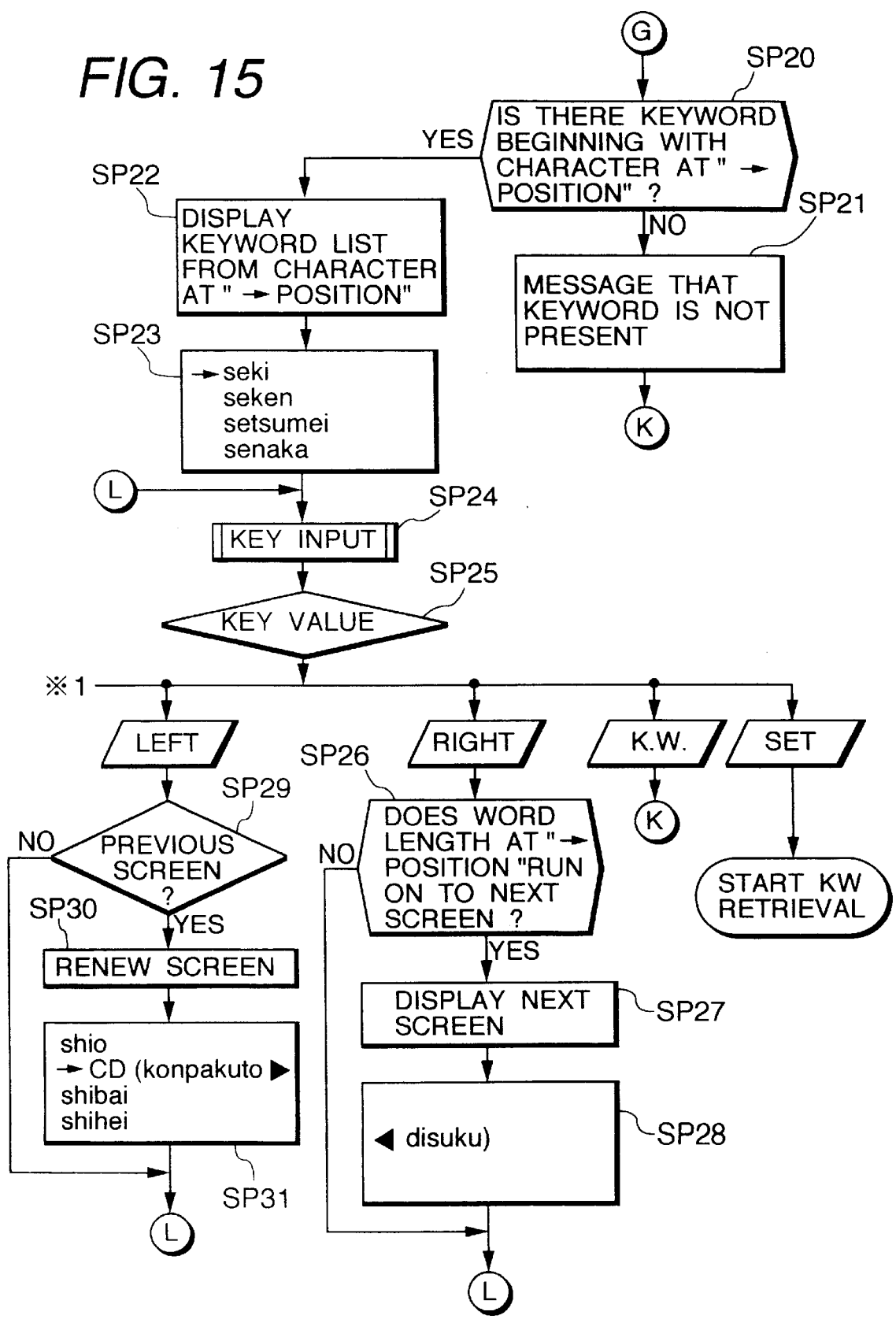
FIG. 15 is a flowchart of the processing program of the portable translating apparatus in accordance with the second embodiment of the present invention.

(4) When the set button 108 is pressed:

If the set button 108 is pressed, the operation proceeds to Step SP20 (see FIG. 15). Here, a determination is made as to whether or not the keyword beginning with the character at the cursor position is present. If the keyword is not present, NO is given as the answer in the determination, and the operation proceeds to Step SP21. Here, a phrase "kiwado wa arimasen. (The keyword is not present.)" is displayed on the display 102, and the operation returns to Step SP2. Hence, the user designates the initial character of another keyword again.

Meanwhile, if the key word is present, YES is given as the answer in the determination in Step SP20, and the operation proceeds to Steps SP22 and SP23. Here, a list of keywords each having the character at the cursor position as the initial character is displayed on the display 102. Incidentally, if the number of keywords is five or more, the first four keywords are displayed on the display 102. For instance, if "se" is designated as the initial character, keywords such as "seki (table/seat)," "seken (society)," and "senaka (the back of one's body) are displayed.

Among the keywords which are displayed on the display 102, some keywords are so long that they cannot be accommodated in a single line on the display 102. In such a case, in Step SP23, only a portion which can be accommodated in the display 102 is displayed. For instance, if the keyword is "CD (konpakuto disuku (compact disk))" and all of the characters cannot be displayed, a displaceable portion "CD (konpakuto" and a rightwardly pointing triangle indicating that one or more remaining characters are present are displayed on the display 102.

A keyword all the characters of which cannot be simultaneously displayed on the display 102 in the above-described manner will be hereafter referred to as a "long keyword." Additionally, the state in which various keywords are displayed on the display 102 will be hereafter referred to as the "state of display of keywords." The details of processing in such a state will be described below in a separate section.

B-5. Processing in the state of display of keywords:

If keywords are displayed in Step SP23, processing proceeds to Step SP24, and the operation waits until one of the buttons is pressed. Then, if one of the buttons is pressed, the operation proceeds to Step SP25, and the following processing is executed depending on the kind of the button pressed.

(1) When the cursor button 109 is pressed:

If the cursor button 109 is pressed, the processing in Steps SP26 to SP45 is carried out. That is, if the cursor button 109 is pressed in the up/down direction, the keyword list is scrolled in a circulating manner. Meanwhile, if the cursor button 109 is pressed in the left/right direction, portions of the long keyword are displayed.

(2) When the keyword retrieving button 104 is pressed:

As described above, the keyword list can be scrolled by pressing the cursor button 109 in the up/down direction. However, in a case where the keyword to be retrieved is substantially remote from the present cursor position, it is inconvenient to display the new keyword by scrolling. In such a case, it suffices if the user presses the keyword retrieving button 104. If the keyword retrieving button 104 is pressed, the operation returns to Step SP2 (see FIGS. 3A to 3C). Namely, by designating the initial character of the new keyword, it is possible to speedily access the new keyword.

Figure 17:
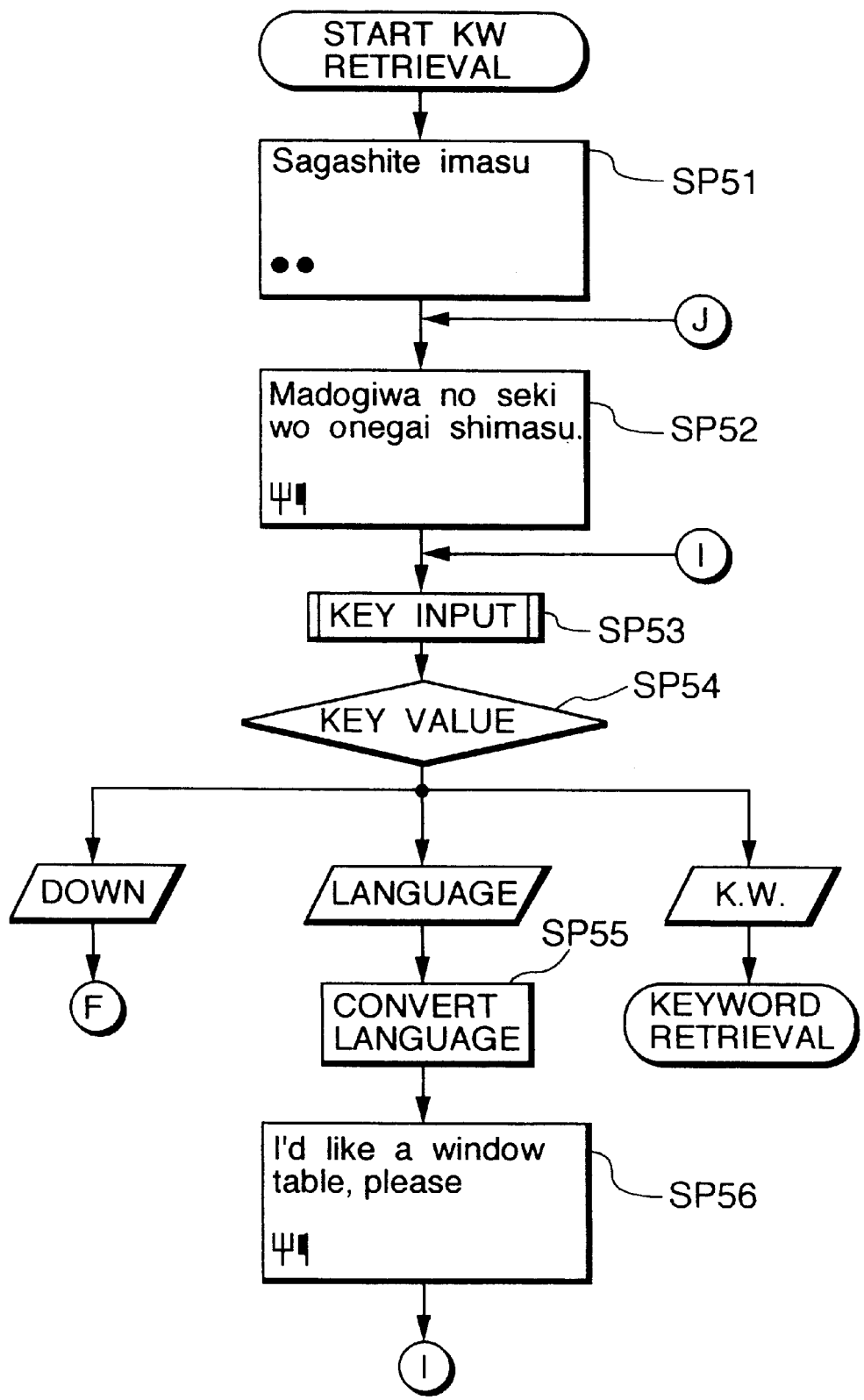
FIG. 17 is a flowchart of the processing program of the portable translating apparatus in accordance with the second embodiment of the present invention.

(3) When the set button 108 is pressed:

As described above, the user is capable of setting the cursor on a desired keyword by appropriately operating the cursor button 109 or the keyword retrieving button 104. If the set button 108 is pressed, the processing (keyword retrieval start processing) shown in FIG. 17 is executed in correspondence with the selected keyword. The contents of the processing will be described below in detail.

B-6. Keyword retrieval start processing:

When the operation proceeds to Step SP51 in FIG. 17, a message "Sagashite imasu (Searching)" is displayed on the display 102, and a code corresponding to the keyword selected earlier is retrieved from the phrase data section. For example, if the keyword is "seki (table/seat)," and the code of "seki" is "1234h," all the codes of "1234h" are retrieved from the phrase data section, and offset values corresponding to the addresses at which these codes are stored are stored in the RAM 112.

Figure 19:
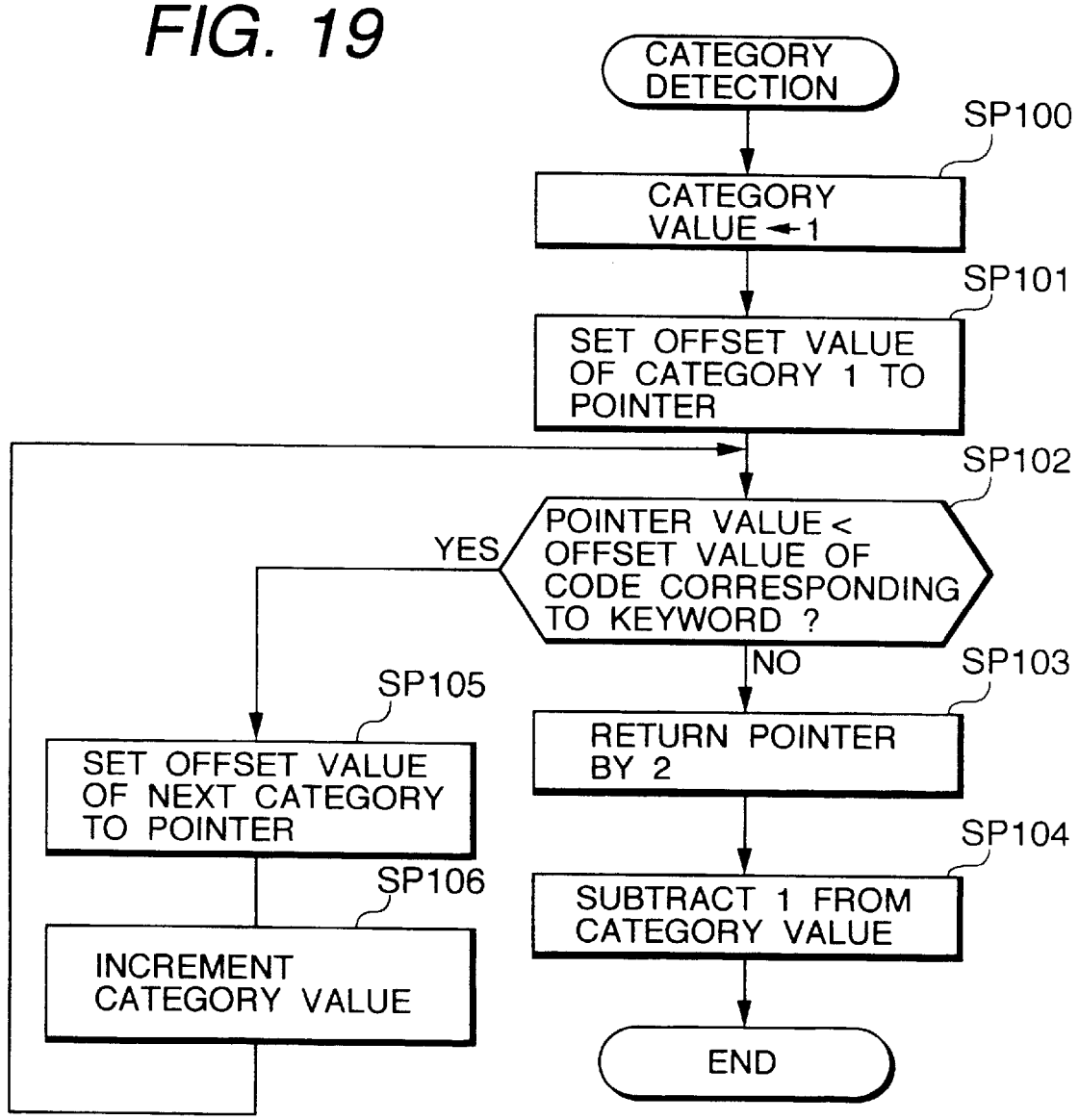
FIG. 19 is a flowchart of the processing program of the portable translating apparatus in accordance with the second embodiment of the present invention.

For example, if the phrase "Madogiwa no seki wo onegai shimasu. (I'd like a window table/seat, please.) is included in the categories "resutoran (restaurant)," and "kotsu (transportation)," the code (1234h) of "seki (table/seat)" is detected twice, and corresponding offset values are determined on each such occasion. Next, The subroutine shown in FIG. 19 is called with respect to each of the obtained offset values. That is, in the above example, the subroutine is first called with respect to the offset value concerning "resutoran (restaurant)."

When the operation proceeds to STEP SP100 in FIG. 19, a category value is set to "1." The category value referred to herein means a category number which is being presently referred to in the table of leading addresses of categories (see FIG. 12). Next, when the operation proceeds to Step SP101, the offset value of "Category No. 1: "resutoran (restaurant)" is set to a predetermined pointer. Then, when the operation proceeds to Step SP102, a determination is made as to whether or not the offset value set to this pointer is less than the offset value subject to processing.

Since the offset value which is presently subject to processing belongs to the category "resutoran (restaurant)," YES is given as the answer in the determination, and the operation proceeds to Step SP105. Here, an offset value concerning a next category (Category No. 2: "kotsu (transportation)" is set to the aforementioned pointer. Then, the category value is incremented by "1" through Step SP106, and the operation returns to Step SP102. Here, since the offset value subject to processing is less than the offset value in the pointer, NO is given as the answer in the determination, and the operation proceeds to Step SP103.

Here, the offset value subject to storage in the pointer is returned by two bytes. That is, since the offset value is comprised of two bytes, the offset value is returned to an immediately preceding offset value. Next, when the operation proceeds to Step SP104, the category number is incremented by "1." That is, the category number becomes "1." When the above steps are completed, the processing of this subroutine ends.

Now, the category number "1" obtained in Step SP104 specifies the category to which the offset value subject to processing belongs. Namely, the code of "seki" which was first retrieved was specified to belong to "Category No. 1: "resutoran (restaurant)." In addition, processing similar to the above-described processing is also carried out with respect to the code of "seki" which was detected for the second time, and this character is specified to belong to (Category No. 2: "kotsu (transportation)."

As described above, in accordance with this embodiment, since the phrase data are collectively stored in units of categories, which categories the codes belong to need not be stored for each category. Accordingly, the required memory capacity of the ROM 113 can be reduced correspondingly by that margin.

Returning to FIG. 17, when all the phrases (phrases including the code of "seki") corresponding to the keyword are retrieved, and the categories corresponding to the respective phrases are detected, the operation proceeds to Step SP52. Here, of the retrieved phrases, a leading one is displayed on the character displaying portion 122, and a pictogram corresponding to that category is displayed on the category displaying portion 123.

In the illustrated example, the phrase "Madogiwa no seki wo onegai shimasu." and a pictogram (a figure symbolizing a knife and a fork) of the category "resutoran (restaurant)" are displayed. Next, when the operation proceeds to Step SP53, the operation waits until one of the buttons is pressed. Then, when one of the buttons is pressed, the operation proceeds to Step SP54, and the following processing is executed depending on the kind of the button pressed.

(1) When the language converting button 103 is pressed:

If the language converting button 103 is pressed, Steps SP55 and SP56 are executed, and the phrase displayed earlier on the display 102 is translated into English. That is, English phrases corresponding to the respective phrases stored in the phrase data section are stored in advance in the ROM 113, and its contents are read out and are displayed on the display 102. In the above example, a display is given as "I'd like a window table, please." When the above steps are completed, the operation returns to Step SP53.

(2) When the cursor button 109 is pressed in the down direction:

If the cursor button 109 is pressed in the downward direction in Step SP53, the operation proceeds to Step SP60 (see FIG. 18) through Step SP54. Here, as for the phrase detected earlier in Step SP51, a determination is made as to whether or not the phrase is present in another category. In the aforementioned example, the phrase "Madogiwa no seki wo onegai shimasu." was detected in the categories " resutoran (restaurant)" and "kotsu (transportation)" with respect to the word "seki."

In this embodiment, even if the character strings making up the phrase are the same, if the categories are different, the phrases are different. Then, after the phrase concerning "resutoran (restaurant)," the phrase concerning "kotsu (transportation)" is detected. Accordingly, in Step SP60, YES is given as the answer in the determination, and the operation proceeds to Step SP61. Here, the subsequently detected phrase and a corresponding pictogram are displayed. In the above example, the pictogram (a figure symbolizing an automobile) of the category "kotsu (transportation)" is displayed on the category displaying portion 123. When the above steps are completed, the operation returns to Step SP53.

Here, if the user presses the language converting button 103, the displayed phrase is translated into English in the above-described manner. However, the read address in the ROM 113 corresponds to the present category "kotsu (transportation)," and the phrase "I'd like a window seat, please." is displayed on the character displaying portion 122 (if a comparison is made with the aforementioned English, "table" has been changed to "seat"). In addition, it goes without saying that the pictogram of "kotsu (transportation)" is displayed on the category displaying portion 123. When the above steps are completed, the operation returns to Step SP53.

Here, if the cursor button 109 is pressed in the downward direction, the operation proceeds to Step SP60 again. Since the phrase concerning "kotsu (transportation)" displayed earlier is the final one of the detected phrases, NO is given here as the answer in the determination, and the operation proceeds to Step SP66. In Step SP66, a message "<Saisho desu>(<This is the first phrase>)" is displayed on the display 102. As a result, the user is capable of understanding that the phrase has returned to the first phrase.

Next, after Steps SP67 and SP68 are executed, the operation returns to Step SP53 to effect the processing in which the initially detected phrase and a pictogram corresponding to that phrase are displayed on the display 102. Thus, as the user continues to press the cursor button 109 in the downward direction, the detected phrases can be displayed in a circulating manner. In addition, if the language converting button 103 is pressed, as required, midway in that process, it is possible to confirm an English phrase.

In particular, in this embodiment, when each phrase is displayed on the character displaying portion 122, a pictogram corresponding to that phrase is displayed on the category displaying portion 123. That is., the user is readily capable of confirming in what scene the displayed phrase (or its English translation) can be used. As a result, it is possible to minimize the possibility of mistranslation based on the confusion of the state in which the language is used.

(3) When the keyword retrieving button 104 is pressed

If the keyword retrieving button 104 is pressed, the operation returns to Step SP1 (see FIGS. 3A to 3C). Accordingly, the user is capable of designating a new keyword so as to display a new phrase.

Figure 22:
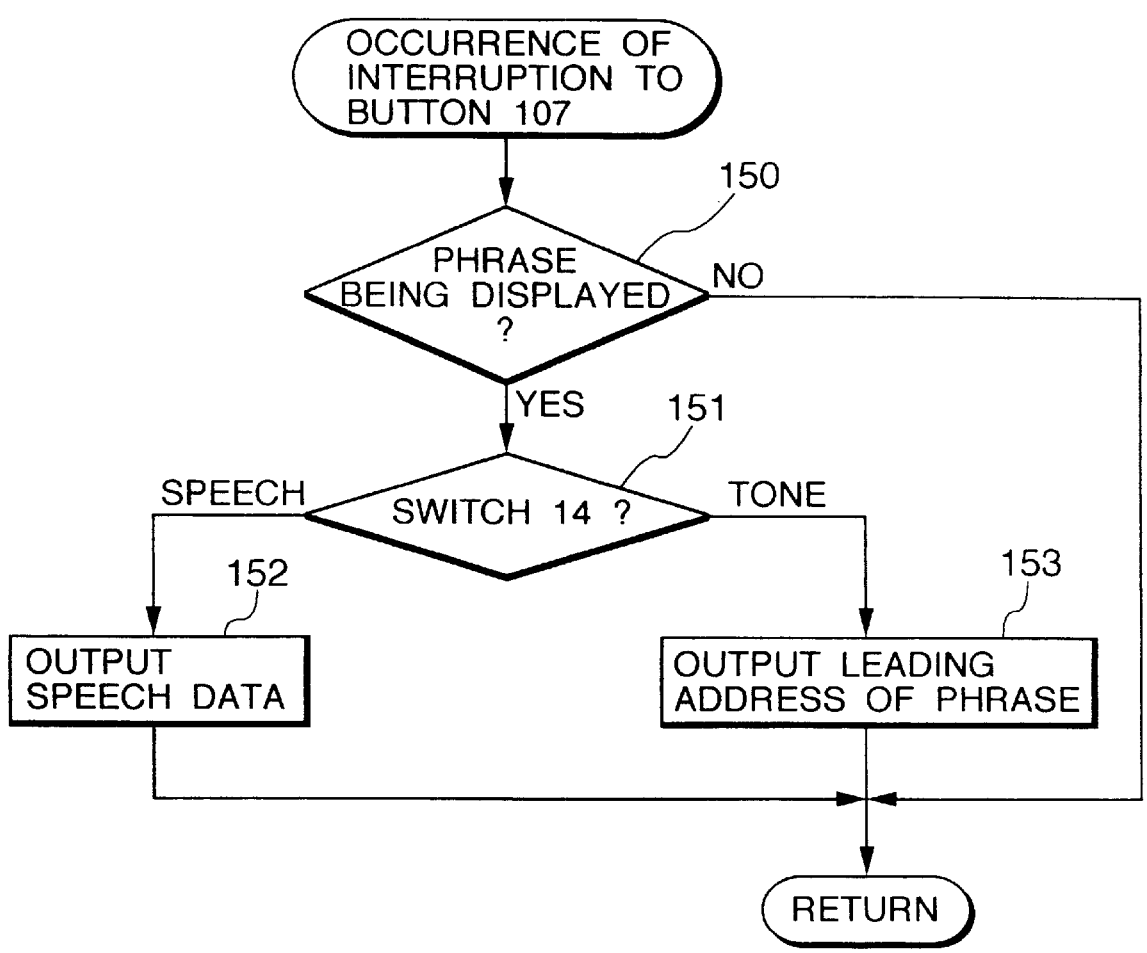
FIG. 22 is a flowchart of an interrupt processing program of the portable translating apparatus in accordance with the second embodiment of the present invention.

B-7. When the transmit/voice button 107 is pressed:

If the transmit/voice button 107 is pressed while one of the various routines described above is being executed, an interruption occurs with respect to the CPU 111, and an interrupt processing routine shown in FIG. 22 is started. When the operation proceeds to Step SP150 in the drawing, a determination is made as to whether or not some phrase is being displayed on the display 102. If no phrase is being displayed, NO is given as the answer in the determination, and the operation returns to the routine persisting prior to the interruption.

In Step SP150, if some phrase is being displayed, YES is given as the answer in the determination, and the operation proceeds to Step SP151. Here, detection is carried out as to which of the speech IC 26 (SPEAK) and the DTMF generator 27 (TONE) the tone/speak changeover switch 14 has been set. If the switch 14 is set to the speech IC 26 side, the operation proceeds to Step SP152, and speech data corresponding to the phrase being displayed is supplied to the speech IC 26 via the tone/speak changeover switch 14.

When the above steps are completed, the operation returns to the routine persisting prior to the interruption. Then, a voice signal is synthesized in the speech IC 26 on the basis of the speech data supplied thereto. As a result, a voice is produced for the phrase being displayed through the amplifier 32 and the speaker 31, respectively. Needless to say, the speech data to be outputted corresponds to the language being displayed (Japanese or English).

Meanwhile, if the tone/speak changeover switch 14 is set to the DTMF generator 27 side, the operation proceeds to Step SP153 via Step SP151. Here, the leading address of the phrase stored in the phrase data section (see FIG. 11B) is supplied to the DTMF generator 27 via the tone/speak changeover switch 14. Also, this leading address is stored in a predetermined area in the RAM 112 so as to record the contents of communication. When the above steps are completed, the operation returns to the routine persisting prior to the interruption.

Then, in the DTMF generator 27, the supplied leading address is converted into a DTMF signal, and the DTMF signal is outputted via the earphone jack 29. A protocol for transmitting the leading address is similar to the one used for transmitting the phrase number in the first embodiment.

B-8. Reception interruption:

When the DTMF signal is supplied to the DTMF receiver 28 via the earphone jack 29, the DTMF receiver 28 causes a reception interruption to occur in the CPU 111. When the reception interruption has occurred, the received DTMF signal is stored in the RAM 112. Then, the operation returns to the routine persisting prior to the interruption. At that time, a display (e.g., the lighting of a "*" mark) indicating data reception is given on the display 102. As a result, the user on the receiving side is capable of immediately ascertaining the reception of data. Incidentally, to confirm the contents of the reception, it suffices to press the reception confirming button 106 (the details will be described below).

Figure 20:
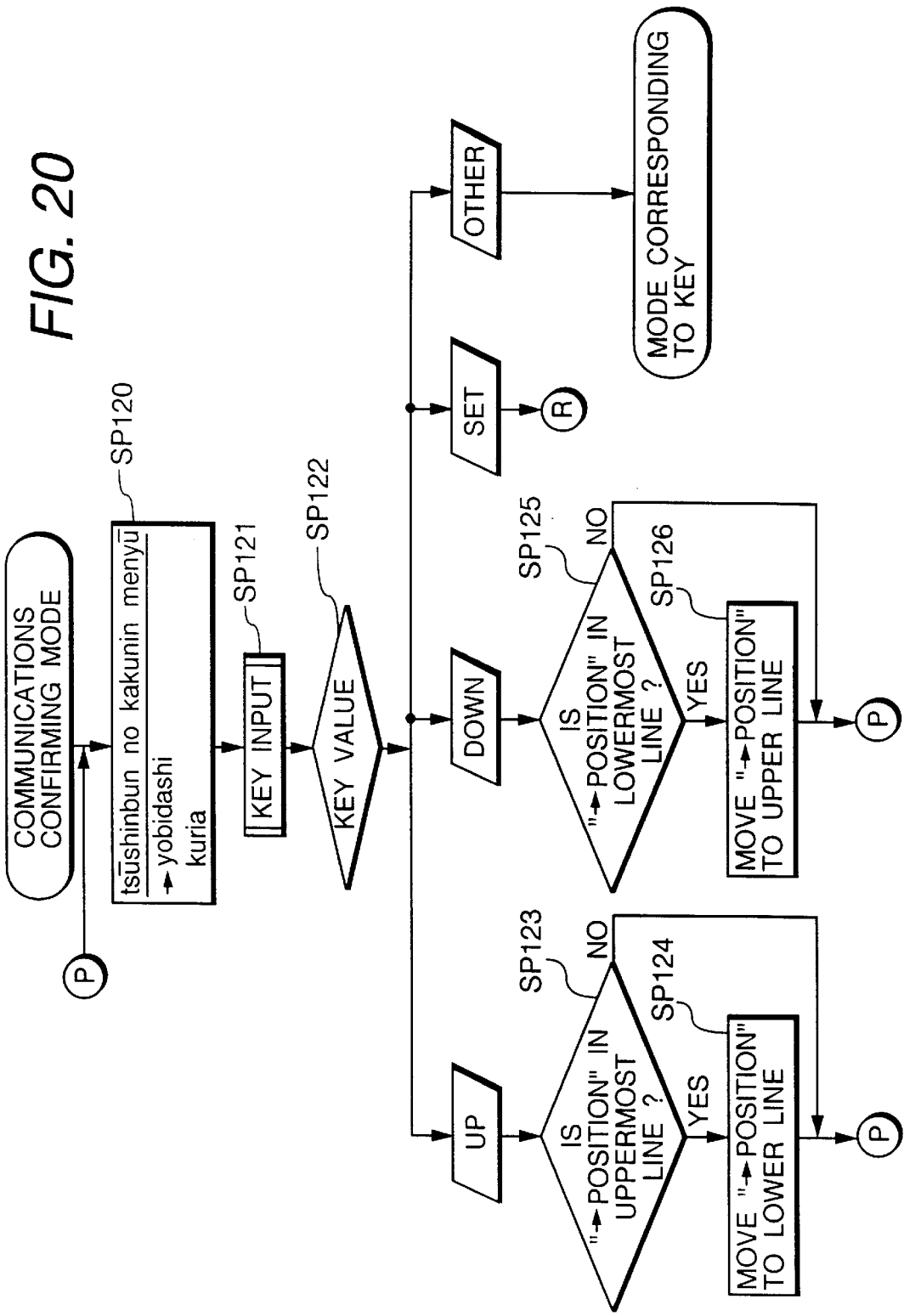
FIG. 20 is a flowchart of the processing program of the portable translating apparatus in accordance with the second embodiment of the present invention.
Figure 21:
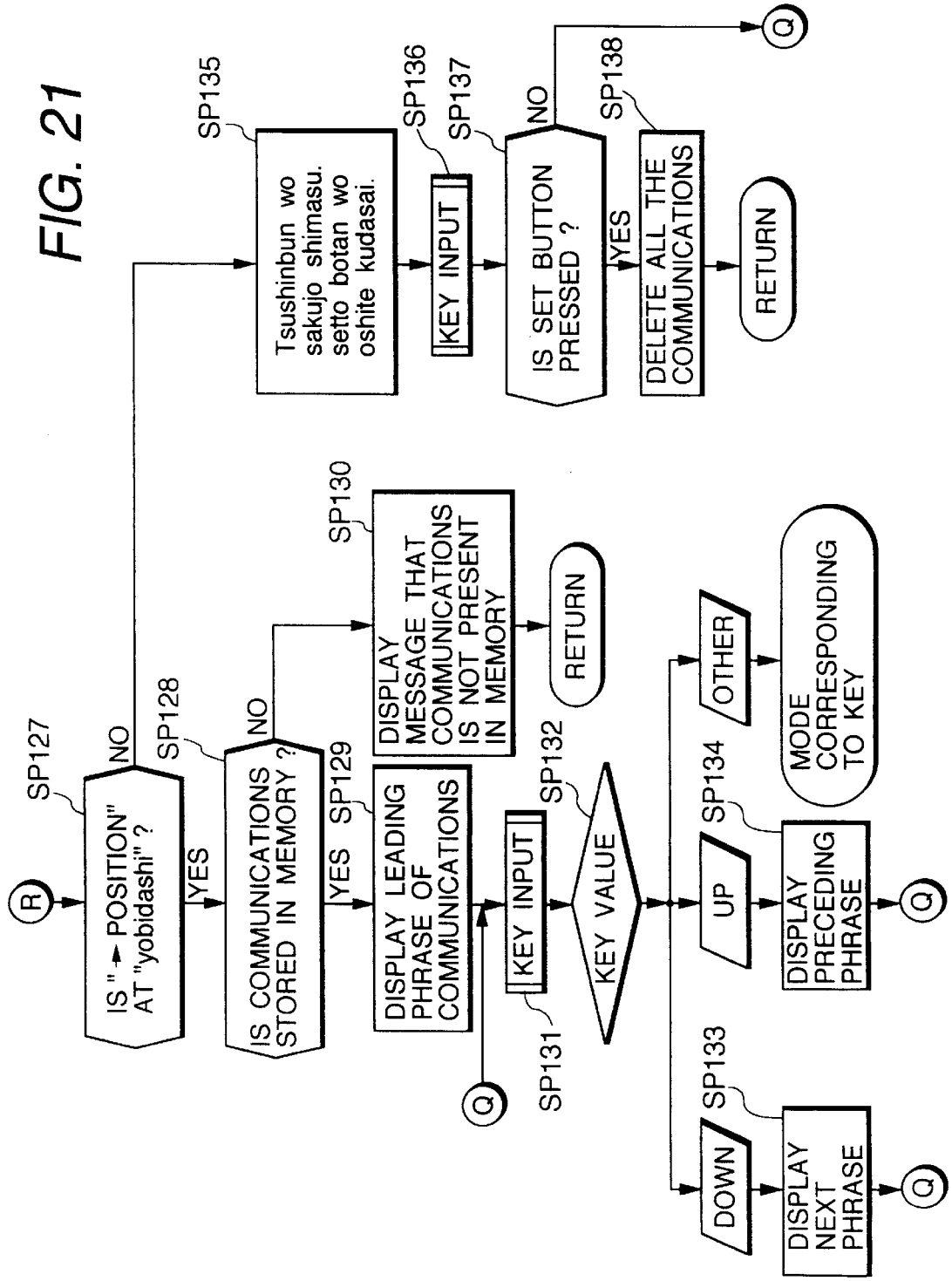
FIG. 21 is a flowchart of the processing program of the portable translating apparatus in accordance with the second embodiment of the present invention.

B-9. When the reception confirmation button 106 is pressed:

If the reception confirming button 106 is pressed during the execution of each of the various routines described above, an interruption occurs in the CPU 111, and an interrupt processing routine shown in FIGS. 20 and 21 is started. In FIG. 20, when the operation proceeds to Step SP120, a title "tsushinbun no kakunin menyu (confirmation menu of communications)" and character strings "yobidashi (call)" and "kuria (clear)" are displayed on the display 102. Then, the cursor position is set on the portion of the former character string.

Next, when the operation proceeds to Step SP121, the operation waits until one of the buttons is pressed. Then, when one of the buttons is pressed, the operation proceeds to Step SP122, and the following processing is executed depending on the kind of the button pressed.

(1) When the cursor button 109 is pressed in the up/down direction:

If the cursor button 109 is pressed in the up/down direction, the processing in Steps SP123 to SP126 is executed, and the cursor position G is set on the character string "yobidashi (call)" or "kuria (clear)."

(2) When the set button 108 is pressed with respect to "yobidashi (call)":

If the set button 108 is pressed, the operation proceeds to Step SP127. Here, a determination is made as to whether or not the cursor is located at "yobidashi (call)." Here, if YES is given as the answer in the determination, the operation proceeds to Step SP128, and a determination is made as to whether or not communications (a leading address of one or more phrases) is stored in the RAM 112. Here, if NO is given as the answer in the determination, the operation proceeds to Step SP130, and a message is displayed on the display 102 to the effect that no communications are stored, and the operation returns to the routine persisting prior to the interruption.

On the other hand, if some communications has been stored, the operation proceeds to Step SP131, and the final phrase in the stored communications is displayed on the display 102. To give a more detailed description, since data for differentiating between transmission and reception and the leading address of the phrase data are actually stored, the phrase data (see FIG. 11B) having a final leading address is read, and that phrase is displayed on the basis of it. At that time, the "♦" mark is attached to the head of the received phrase in the same way as in the first embodiment.

In addition, in this embodiment, the respective phrase data are arranged for each category, as described above. Accordingly, if the leading address of the phrase data is specified, the category of that phrase data is immediately specified. Accordingly, in this embodiment, the pictogram corresponding to the specified category is displayed on the category displaying portion 123. Next, when the operation proceeds to Step SP131, the operation waits until one of the buttons is pressed. Then, if one of the buttons is pressed, the operation proceeds to Step SP132, and the following processing is executed depending on the kind of the button pressed.

(a) When the cursor button 109 is pressed in the downward direction or upward direction:

If the cursor button 109 is pressed in the downward direction, the operation proceeds to Step SP133. Here, a phrase following the phrase being presently displayed is displayed on the display 102, the operation returns to Step Spl31. Similarly, if the cursor button 109 is pressed in the upward direction, the operation proceeds to Step SP134, and a phrase immediately preceding the phrase being present displayed is displayed.

Figure 16:
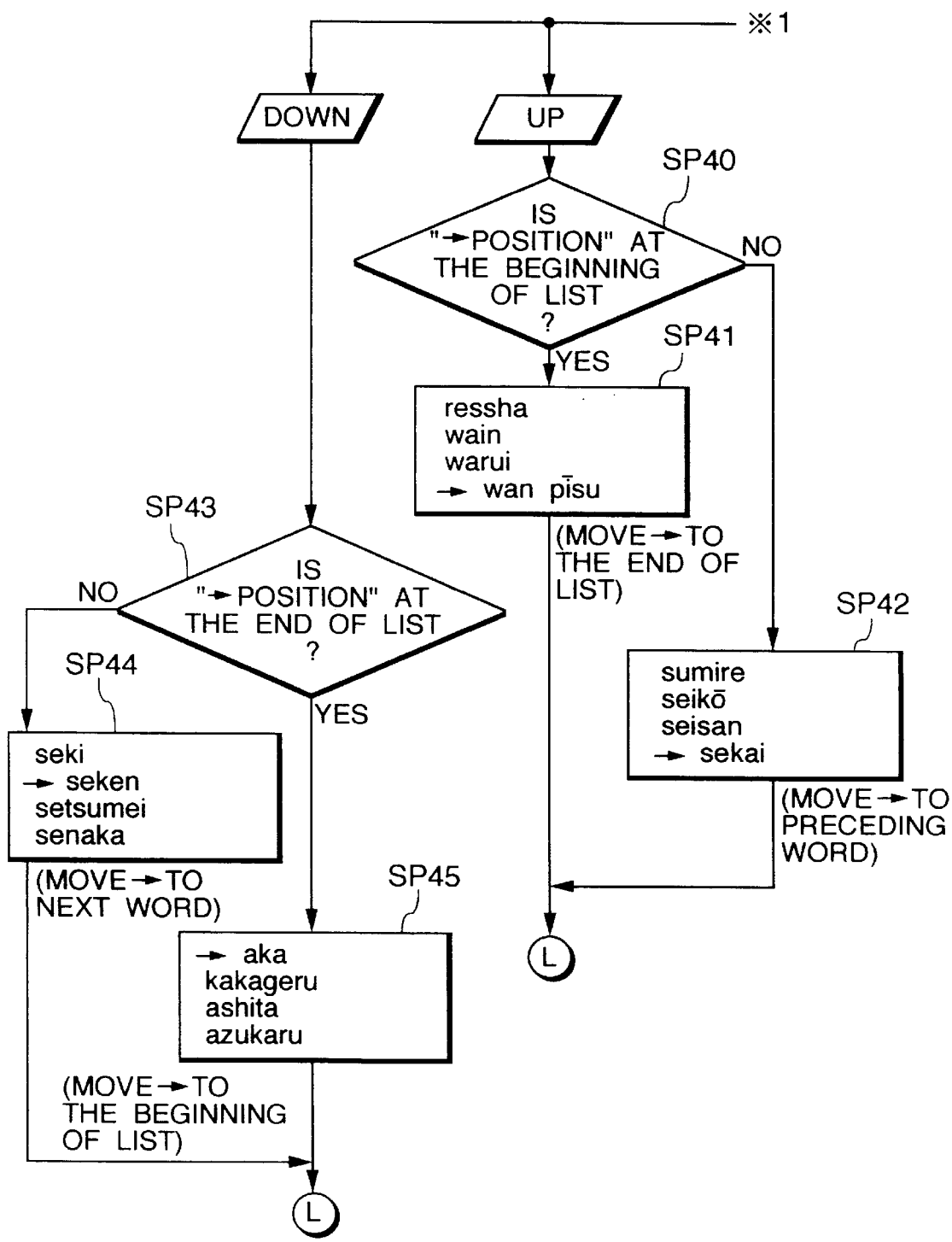
FIG. 16 is a flowchart of the processing program of the portable translating apparatus in accordance with the second embodiment of the present invention.

Incidentally, although the processing in Steps SP133 and SP134 is simplified in the flowchart, processing similar to that in Steps SP40 to SP45 (see FIG. 16) is actually carried out. As the user presses the cursor button 109 in the up/down direction in this manner, the display of the phrases is scrolled. Then, each time the phrase to be displayed is changed, a pictogram corresponding to the category to which the phrase belongs is displayed on the category displaying portion 123.

One of the features of this embodiment lies in this aspect. That is, since the receiving party is able to immediately ascertain the category of the phrase by means of the pictogram, the receiving party is able to readily recognize the scene which has been assumed for carrying out the conversation. Further, in a case where the receiving party confirms the contents of the phrases which the receiving party received in the past, the receiving party is capable of obtaining a rough idea as to the contents of the phrases without reading the phrases themselves. For example, a case is now considered in which the contents concerning a reservation on a train were transmitted and received in the past, and the contents are to be confirmed again.

In such a case, the user on the receiving side focuses his or her attention on the category displaying portion 123 while scrolling the phrases, and if pictograms other than that of "kotsu (transportation)" are displayed, the user can ignore the phrases. Then, only when the pictogram of "kotsu (transportation)" is displayed, it suffices for the user to confirm the specific content of the phrase and determine whether or not it is the desired phrase. Thus, in accordance with this embodiment, the user is capable of detecting a desired phrase at high speed among the phrases received in the past, thereby making it possible to reduce the communication cost to an even lower level.

(b) When another button is pressed:

If another button is pressed in Step SP131, processing is executed in correspondence with the pressed button. For example, if the language converting button 103 is pressed, the language (English or Japanese) of the phrase on the display is altered. In addition, if the set button 108 is pressed, this interrupt processing routine ends, and the operation returns to the routine persisting prior to the interruption.

However, if the phrase was being displayed in the routine persisting prior to the interruption, that phrase is altered to the phrase displayed last in this interrupt processing routine. As a result, needless to say, the category after the return is also altered in correspondence with that new phrase. In other words, if the user on the transmitting side transmits a phrase belonging to a certain category, the category on the receiving side also follows suit.

Incidentally, in the phrase data section (see FIG. 11B), it is preferable if certain question phases and reply phrases concerning the same are stored serially. The reason for this is that the user who has received a question phrase is capable of obtaining an example of a reply simply by pressing the cursor button 109 consecutively in the downward direction, for instance.

(3) When the set button 108 is pressed with respect to "kuria (clear)":

When the set button 108 is pressed in Step SP121, if the cursor position is at "kuria (clear)," the operation proceeds to Step SP135 through Step SP127. Here, a message is displayed on the display 102 to the effect that "Tsushinbun wo sakujo shimasu. Setto botan wo oshite kudasai. (Communications will be deleted. Press the set button.)." Incidentally, if English has been selected as the language for display, similar contents are displayed in English.

Next, when the operation proceeds to Step SP136, the operation waits until one of the buttons is pressed. When one of the buttons is pressed, the operation proceeds to Step SP137, and a determination is made as to whether or not the pressed button is the set button 108. Here, if NO is given as the answer in the determination, the operation proceeds to Step SP131, and processing similar to that described above is carried out. If, on the other hand, YES is given as the answer in the determination, all the communications stored in the RAM 112 are deleted, and the operation returns to the routine persisting prior to the interruption.

(4) When another button is pressed:

If another button is pressed in Step SP121, processing is executed depending on the kind of the button pressed. For example, if the language converting button 103 is pressed, the character strings to be displayed ("tsushinbun no kakunin menyu (confirmation menu of communications)," "yobidashi (call)," and "kuria (clear)") are displayed in English. In addition, if the set button 108 is pressed, this interrupt processing routine ends, and the operation returns to the routine persisting prior to the interruption.

C. Advantages of the embodiment:

This embodiment is particularly suitable when the apparatus is used in cases where the categories concerning the conversation are change over, as necessary.

For example, even when the users are engaging in a conversation (communication) concerning a personal matter, there are cases where one party request a reservation on a train, or they engage in a conversation on food, so that there arises the need to change over the category, as necessary.

In this embodiment, if the user on the transmitting side transmits a phrase belonging to a certain category, the category on the receiving party also follows suit, so that the operation such as the selection of a phrase on the receiving side can be effected speedily. Thus, in this embodiment, it is possible to retrieve a phrase efficiently, thereby making it possible to reduce the communication cost to an even lower level.

(Modification)

The present invention is not limited to the above-described embodiments, and various modifications are possible as described below.

(1) Although, in the language-information providing apparatuses in the first and second embodiments, the DTMF signal is used for communication with the other party's apparatus, the signal for communication is not necessarily confined to the DTMF signal. For example, a corresponding phrase number may be transmitted by using a digital line.

(2) In addition, although, in the language-information providing apparatus in the first embodiment, Yes and No are used as words or phrases of a high frequency of use, other words or phrases may be used. For example, the user may separately register words or phrases of a high frequency of use, and an arrangement may be provided such that a desired word or phrase is designated by pressing a registration/reading button or the like. As a phrase of a high frequency of use is separately designated, it is possible to send a reply or a question speedily, thereby permitting smoother communication and a reduction in the telephone charges.

(3) In addition, although, in the description of the flowchart in FIG. 6 and the operation shown in FIGS. 7A to 7H in the first embodiment, the communication and reception with a user in a remote plate are carried out by transmitting and receiving a phrase number, it is possible to transmit the phrase directly in the form of voice information by recognizing the language which the user of the other apparatus can understand. In the second embodiment as well, it goes without saying that the phrase may be transmitted in a similar manner.

(4) In the second embodiment (particularly FIGS. 17 and 18), even if the Japanese character trains constituting the phrases are identical, if the categories differ, the phrases are handled as being different phrases, and are not displayed simultaneously on the display 102. However, the Japanese character trains which are identical may be displayed simultaneously together with a plurality of pictograms.

Figure 18:
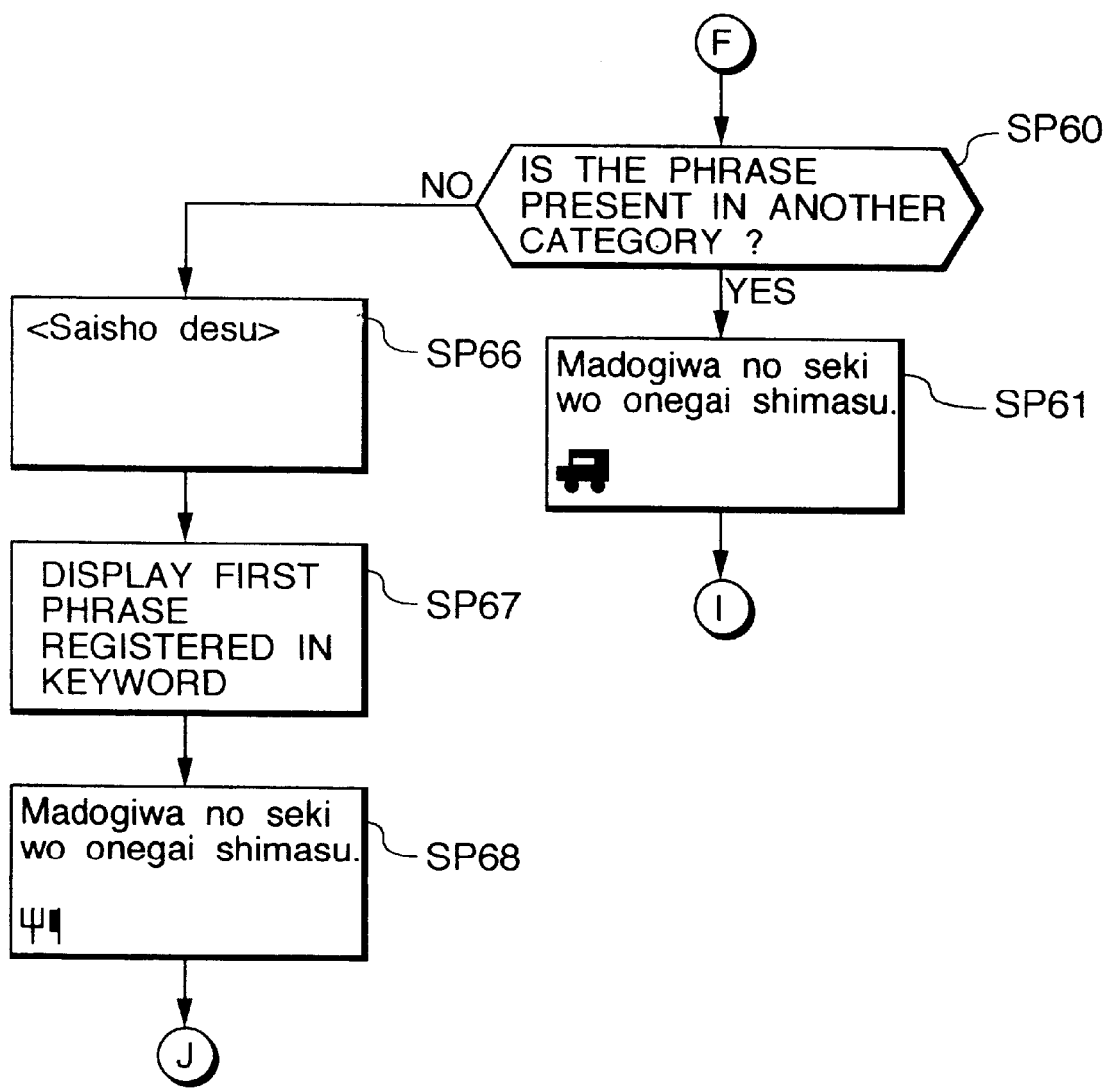
FIG. 18 is a flowchart of the processing program of the portable translating apparatus in accordance with the second embodiment of the present invention.

In the example shown in FIGS. 17 and 18, the pictograms of "resutoran (restaurant)" and "kotsu (transportation)" may be displayed on the display 102 together with the character train "Madogiwa no seki wo onegai shimasu. (I'd like a window table/seat, please.)." In this case, more preferably, an arrangement may be provided such that a desired pictogram (category) is selected by pressing the cursor button 109 in the left/right direction, and the selected pictogram is displayed in a flashing manner. Incidentally, it goes without saying that if the user presses the language converting button 103, an English phrase corresponding to the selected pictogram is displayed.

(5) Further, in such a case (in the case where Japanese character trains are identical, and an English phrase corresponding to either one of them is being displayed), an arrangement may be provided such that a plurality of pictograms are displayed on the display 102, a presently selected pictogram is flashed, and the user is allowed to select the pictogram by means of the cursor button 109. That is, in the above example, by pressing the cursor button 109 in the left/right direction, the English phrases "I'd like a window table, please." and "I'd like a window seat, please." are displayed by being changed over, as required.

In addition, the translations can be displayed over a plurality of lines. At that time, a pictogram can be displayed at the beginning of each line, and the difference between the expressions can be confirmed on the identical screen. Namely, in the above example, the English phrases "I'd like a window table, please." and "I'd like a window seat, please." are displayed simultaneously together with their corresponding pictograms.

As a result, the user is readily capable of ascertaining how the English expressions differ depending on scenes. In addition, if an appropriate category cannot be found among the categories prepared in the portable translating apparatus, the user must determine an apparently most suitable category by comparing the results of translation among the categories. At that time, in this modification, speedy translation operation can be effected since the results of translation can be compared by pressing the cursor button 109 in the left/right direction or on the identical screen.

As described above, in accordance with the invention according to the first aspect of the invention, a particular language is selected from among a plurality of languages, a particular phrase is read out in the selected language, and the phrase can be transmitted to another party's apparatus. Therefore, smooth and reliable communication with a receiver located in a remote place is possible.

In accordance with the invention according to the second aspect of the invention, a relevant phrase is outputted in a language which can be understood by the user of the receiver, on the basis of particular phrase information received from a remote place. Accordingly, a smooth and reliable response is possible without adherence to the language used by the user in the remote place.

In accordance with the invention according to the third aspect of the invention, it is easy to make a distinction between a received phrase and other phrases or the like such as those selected by oneself. Hence, an adequate response is possible without confusing the contents of the conversation, so that smoother communication can be attained.

In accordance with the invention according to the fourth aspect of the invention, the user is capable of simply designating and transmitting a phrase of a high frequency of use, thereby allowing a reduction in the communication time and smoother communication.

In accordance with the arrangement according to the fifth and sixth aspects of the invention, since the scope of a desired phrase can be narrowed down by the designating of its attribute, the phrase can be selected speedily.

In accordance with the arrangement according to the seventh aspect of the invention, since the scope of a desired phrase can be narrowed down by means of a keyword and an attribute, the phrase can be selected more speedily.

In accordance with the arrangement according to the eighth aspect of the invention since the displaying means displays the attribute to which the phrase or word received by the receiving means belongs, the receiving party is capable of speedily recognizing the scene to which the conversation relates. Further, in accordance with the arrangement according to the ninth aspect of the invention, since the attribute being displayed is automatically changed over to one corresponding to a newly displayed phrase or word, it is possible to more readily retrieve the related phrases or the like.

In accordance with the arrangement according to the tenth aspect of the invention, the communicated phrase or word is stored in the communication-content storage means, and the output means reads and outputs the content of communication from the communication-content storage means as required. Hence, the history of communication can be confirmed easily.

While there has been described in connection with the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. An interactive system providing language information, comprising:

phrase storage means for storing a plurality of phrases wherein said phrases are stored in a predetermined language, and each of said phrases have phrase information and ordered so that first phrases of the plurality of phrases which are questions immediately precede second phrases of the plurality of phrases which are replies to the first phrases of the plurality of phrases which are questions;

input means for inputting a phrase of a high frequency of use among the plurality of phrases wherein the input means inputs only the phrase of a high frequency of use; and transmitting means for transmitting phrase information of the phrase storage means specifying the phrase input by said input means for use by a remote system.

2. An interactive system providing language information comprising:

phrase storage means for storing a plurality of attributes, each attribute having a plurality of phrases wherein said phrases are stored in a predetermined language and ordered so that first phrases of the plurality of phrases which are questions immediately precede second phrases of the plurality of phrases which are replies to the first phrases of the plurality of phrases which are questions;

attribute designating means for designating a designated attribute of the plurality of attributes;

phrase designating means for designating a phrase from among the plurality of phrases having the designated attribute as designated by said attribute designating means; and transmitting means for transmitting phrase information of the phrase storage means specifying the designated phrase and the designated attribute to a remote system.

3. An interactive system providing language information, comprising:

keyword designating means for designating a keyword;

phrase storage means for storing a plurality of phrases and/or words wherein said phrases and/or words are stored in a predetermined language and wherein each of the plurality of said phrases and/or words is classified by an attribute and ordered so that first phrases of the plurality of phrases which are questions immediately precede second phrases of the plurality of phrases which are replies to the first phrases of the plurality of phrases which are questions;

output means for outputting a phrase or a word from the plurality of phrases and/or words relating to said designated keyword along with a phrase or word attribute associated with said phrase or word;

transmitting means for transmitting said phrase or word of the phrase storage means and said phrase or word attribute associated with said phrase or word of the phrase storage means to a remote system.

4. An interactive system providing language information comprising:

storage means for storing phrases and/or words wherein said phrases and/or words are classified by a plurality of attributes and ordered so that first phrases of the plurality of phrases which are questions immediately precede second phrases of the plurality of phrases which are replies to the first phrases of the plurality of phrases which are questions;

receiving means for receiving data from a remote system specifying a first one of the phrases or words of the storage means;

attribute detecting means for detecting a first attribute of said first specified phrase or word;

display means for displaying said first specified phrase or said first specified word and displaying said first detected attribute; and transmitting means for transmitting said first specified phrase or said first specified word of the storage means and said first detected attribute to a remote system.

5. The interactive system according to claim 4, further comprising a means to automatically change said first attribute being displayed to a second attribute corresponding to a new phrase or a new word if said first phrase or said first word being displayed is updated to the new phrase or the new word.

6. The interactive system according to claim 3, wherein said output means is a visual display device.

7. The interactive system according to claim 3, wherein said output means includes an auditory output device.

8. The interactive system according to claim 6, wherein the display includes a character displaying portion and a phrase usage attribute displaying portion.

9. The interactive system according to claim 6, further comprising an auditory output device that audibly outputs speech information corresponding to the one or more identified phrases.

10. The interactive system according to claim 8, wherein the phrase usage attribute displaying portion displays phrase usage attributes in the form of pictograms.

11. A language information device, comprising:

a keyword input interface by which a keyword may be input;

a phrase memory for storing a plurality of phrases wherein the phrases are classified by one or more phrase usage attributes and ordered so that first phrases of the plurality of phrases which are questions immediately precede second phrases of the plurality of phrases which are replies to the first phrases of the plurality of phrases which are questions;

a processor, the processor operating to identify one or more identified phrases of the plurality of phrases based on the keyword;

a display that displays the one or more identified phrases along with an associated phrase usage attribute; and a transmitter that transmits to a remote device, information regarding the identified phrases of the phrase memory and the associated phrase usage attributes.

12. A language information device, comprising:

a keyword input interface by which a keyword may be input;

a phrase memory that stores a plurality of phrases wherein the phrases are classified by one or more phrase usage attributes and ordered so that first phrases of the plurality of phrases which are questions immediately precede second phrases of the plurality of phrases which are replies to the first phrases of the plurality of phrases which are questions;

a processor, the processor operating to identify one or more identified phrase of the plurality of phrases based on the keyword;

a user interface by which one of the one or more identified phrases may be selected; and a transmitter that transmits information regarding the selected one or more identified phrases of the phrase memory to another language information device, the information including a phrase identifier and a phrase usage attribute of the selected one or more identified phrases.

13. A language information device, comprising:

a phrase memory that stores a plurality of phrases wherein the phrases wherein the phrases are classified by one or more phrase usage attributes and ordered so that first phrases of the plurality of phrases which are questions immediately precede second phrases of the plurality of phrases which are replies to the first phrases of the plurality of phrases which are questions;

a receiver that receives phrase information regarding a phrase of the phrase memory from another language information device, the phrase information including a phrase usage attribute of the phrase; and a processor that identifies a phrase from the plurality of phrases stored in the phrase memory based on the received phrase information.

14. The language information device of claim 13, further comprising a display that displays the identified phrase and the phrase usage attribute associated with the identified phrase.

15. A language information device, comprising:

a storage means for storing a plurality of phrases wherein the phrases are classified by one or more phrase usage attributes and ordered so that first phrases of the plurality of phrases which are questions immediately precede second phrases of the plurality of phrases which are replies to the first phrases of the plurality of phrases which are questions;

a receiving means for receiving phrase information regarding a phrase from another language information device, the phrase information including a phrase usage attribute of the phrase; and and identification means for identifying a phrase from the plurality of phrases stored in the storage means based on the received phrase information.

16. A method of transmitting phrase information to a receiving device, comprising:

receiving a keyword;

identifying one or more identified phrases from a plurality of stored phrases based on the received keyword, the one or more identified phrases having associated phrase usage attribute information and wherein the phrases are ordered so that first phrases of the plurality of phrases which are questions immediately precede second phrases of the plurality of phrases which are replies to the first phrases of the plurality of phrases which are questions;

selecting a selected phrase from the one or more identified phrases; and transmitting phrase information regarding the selected stored phrase to the receiving device, the phrase information including a phrase identifier and the phrase usage attribute information of the selected one or more identified phrases.

17. A method of displaying a phrase, comprising:

receiving phrase information regarding a phrase from a sending device, the phrase information including a phrase usage attribute of the phrase;

identifying a phrase from a plurality of phrases stored in a storage means based on the received phrase information and where the phrases are ordered so that first phrases of the plurality of phrases which are questions immediately precede second phrases of the plurality of phrases which are replies to the first phrases of the plurality of phrases which are questions;

displaying the identified phrase stored in a storage means along with phrase usage information associated with the identified phrase.

18. A method of providing language information, comprising:

storing a plurality of attributes, each attribute having a plurality of phrases wherein the phrases are stored in the predetermined language and ordered so that first phrases of the plurality of phrases which are questions immediately precede second phrases of the plurality of phrases which are replies to the first phrases of the plurality of phrases which are questions;

designating any one of the plurality of attributes;

designating a phrase from among the plurality of phrases having the designated attribute; and transmitting stored phrase information specifying the designated phrase and the designated attribute to a remote system.

* * * * *